US012605019B2

(12) United States Patent
Wasada et al.

(10) Patent No.: US 12,605,019 B2
(45) Date of Patent: Apr. 21, 2026

(54) ABNORMALITY DETECTION SYSTEM

(71) Applicant: TOTO LTD., Kitakyushu (JP)

(72) Inventors: Tetsuhiro Wasada, Fukuoka (JP);
Yoshihiro Sugita, Fukuoka (JP); Miho Otake, Fukuoka (JP); Shoma Morishita, Fukuoka (JP); Koki Nomura, Fukuoka (JP); Masamichi Tosaki, Fukuoka (JP); Hiroshi Tsuboi, Fukuoka (JP)

(73) Assignee: TOTO LTD., Kitakyushu (JP)

( * ) Notice: Subject to any disclaimer, the term of this patent is extended or adjusted under 35 U.S.C. 154(b) by 226 days.

(21) Appl. No.: 18/118,758

(22) Filed: Mar. 8, 2023

(65) Prior Publication Data

US 2023/0292965 A1     Sep. 21, 2023

(30) Foreign Application Priority Data

Mar. 16, 2022     (JP) ................................. 2022-041715
Mar. 16, 2022     (JP) ................................. 2022-041716

(51) Int. Cl.
*A47K 17/00*        (2006.01)
*G06V 20/52*        (2022.01)

(52) U.S. Cl.
CPC .............. *A47K 17/00* (2013.01); *G06V 20/52* (2022.01)

(58) Field of Classification Search
CPC .................................................... A47K 17/00
USPC ............................................................ 4/661
See application file for complete search history.

(56) References Cited

U.S. PATENT DOCUMENTS

| | | | |
|---|---|---|---|
| 2002/0005782 A1 | 1/2002 | Sakai et al. | |
| 2019/0243342 A1* | 8/2019 | Kimura | G08B 21/043 |
| 2019/0268360 A1 | 8/2019 | Yamanashi et al. | |
| 2020/0392710 A1* | 12/2020 | Saruta | G06Q 50/10 |
| 2022/0237906 A1* | 7/2022 | Ueda | G06V 10/7747 |

FOREIGN PATENT DOCUMENTS

| | | |
|---|---|---|
| CA | 3091721 | 8/2019 |
| CN | 108647794 | 10/2018 |
| CN | 108962375 | 12/2018 |
| CN | 109791724 | 5/2019 |
| CN | 110191433 | 8/2019 |
| IN | 202047039343 | 9/2020 |
| JP | 2015-153341 | 8/2015 |
| JP | 2018-133066 | 8/2018 |

(Continued)

OTHER PUBLICATIONS

Chinese Office Action for Chinese Patent Application No. 202310209860.5 dated Jul. 31, 2025.

(Continued)

*Primary Examiner* — Huyen D Le
(74) *Attorney, Agent, or Firm* — Amin, Turocy & Watson, LLP

(57) ABSTRACT

An abnormality detection system according to an embodiment has an acquisition unit that acquires information that indicates a tendency of a usage state of one use item that is provided as an item for use that is executed by a user of a toilet, and a determination unit that determines that an abnormality concerning the one use item occurs in a case where a tendency of the usage state of the one use item is separated from a use tendency of the one use item in past.

10 Claims, 6 Drawing Sheets

(56)     References Cited

FOREIGN PATENT DOCUMENTS

| | | |
|---|---|---|
| JP | 2019-503444 | 2/2019 |
| JP | 2019-141565 | 8/2019 |
| JP | 2002-032883 | 1/2022 |
| WO | 2017/106445 | 6/2017 |

OTHER PUBLICATIONS

Yang, et al. "Research on detecting abnormality in smart monitoring system for empty nest elder", Computer Engineering and Applications , 2009 , 45 ( 16 ) : 242-245.
Takabatake, et al. "FMCW Radar-based Anomaly Detection in Toilet by Supervised Machine Learning Classifier", Downloaded Aug. 18, 2025 from IEEE Xplore.

* cited by examiner

121

| FACILITY | TOILET SPACE | ARRANGE-MENT LOCATION | ARRANGEMENT ELEMENT | ... |
|----------|--------------|-----------------------|---------------------|-----|
| FACILITY X | $2_1$ | TB1 | $10_{11}$ | ... |
| | | TB2 | $10_{12}$ | ... |
| | | TB3 | $10_{13}$ | ... |
| | | CS1 | $20_{11}, 20_{12}, 20_{13}, 30_{11}, 30_{12}, 30_{13}$ | ... |
| | | ... | ... | ... |
| | $2_2$ | ... | ... | ... |
| | ... | ... | ... | ... |
| ... | ... | ... | ... | ... |

ABNORMALITY DETECTION SYSTEM

CROSS-REFERENCE TO RELATED APPLICATION(S)

This application is based upon and claims the benefit of priority from Japanese Patent Applications No. 2022-041715 and No. 2022-041716, both filed on Mar. 16, 2022, the entire contents of all of which are incorporated herein by reference.

FIELD

A disclosed embodiment(s) relate(s) to an abnormality detection system.

BACKGROUND

A system that detects an abnormality for a use item of a toilet in a toilet booth, etc., has been known conventionally (for example, Japanese Patent Application Publication No. 2002-032883). For example, a system that is described in Japanese Patent Application Publication No. 2002-032883 determines an abnormality when a number of a use time(s) of a life infrastructure in a house, such as a toilet, is a predetermined value or less.

However, there is room for improvement in a technique as described above. For example, a system according to a conventional technique as described above may erroneously determine an abnormality in a case where reduction of a number of a use time(s) of a toilet, etc., is not abnormal and depends on nighttime, a holiday, etc. Thus, there is room for improvement in abnormality determination that is executed by a system as described above. Hence, it is desired that an abnormality concerning a use item of a toilet such as a toilet booth where a toilet basin is arranged is determined appropriately.

As a point as described above is taken into consideration, a problem is to determine an abnormality concerning a use item of a toilet appropriately.

A disclosed embodiment(s) aim(s) to provide an abnormality detection system that is capable of determining an abnormality concerning a use item of a toilet appropriately.

An abnormality detection system according to one aspect of embodiments having: an acquisition unit that acquires information that indicates a tendency of a usage state of one use item that is provided as an item for use that is executed by a user of a toilet; and a determination unit that determines that an abnormality concerning the one use item occurs in a case where a tendency of the usage state of the one use item is separated from a use tendency of the one use item in past.

In an abnormality detection system according to an aspect of an embodiment, in a case where a tendency of a usage state of one use item is separated from a use tendency of the one use item in past, it is possible to estimate that something happens in such one use item, so that it is possible to find an abnormality promptly by determining such an abnormality. Furthermore, for example, an abnormality detection system does not erroneously determine an abnormality for an event that is not abnormal and reduces a number of a user(s), such as a holiday and/or regular cleaning, differently from a conventional one, so that it is possible to find an abnormality accurately. Therefore, it is possible for an abnormality detection system to determine an abnormality concerning a use item of a toilet appropriately. Thus, an abnormality detection system compares a usage state of an instrument for a certain time period with a usage state thereof in past and determines an abnormality in a case where such a tendency is deviated. Additionally, as described later, illustration of a use item may be, for example, a variety of items such as a toilet basin, a toilet booth that is provided with a toilet basin, a urinal, a lavatory sink, a toilet space, or a liquid soap supply device. Furthermore, a usage state as provided herein includes a variety of information that indicates a state of use of a use item such as a number of a use(s) per a predetermined time period or a cumulative use time period per a predetermined time period.

In the abnormality detection system according to one aspect of embodiments, the acquisition unit acquires information that indicates a tendency of a number of a use(s) per a predetermined time period for the one use item; and the determination unit determines that an abnormality concerning the one use item occurs in a case where a tendency of the number of a use(s) of the one use item is separated from a use tendency of the one use item in past.

In an abnormality detection system according to an aspect of an embodiment, in a case where a tendency of a number of a use(s) per a predetermined time period for one use item is separated from a use tendency of the one use item in past, it is possible to estimate that something happens in such one use item, so that it is possible to find an abnormality promptly by determining such an abnormality. Furthermore, for example, an abnormality detection system does not erroneously determine an abnormality for an event that is not abnormal and reduces a number of a user(s), such as a holiday and/or regular cleaning, differently from a conventional one, so that it is possible to find an abnormality accurately. Therefore, it is possible for an abnormality detection system to determine an abnormality concerning a use item of a toilet appropriately. Thus, an abnormality detection system compares a number of a use(s) of an instrument for a certain time period with a number of a use(s) thereof in past and determines an abnormality in a case where such a tendency is deviated.

In the abnormality detection system according to one aspect of embodiments, the one use item is one of a toilet booth, a lavatory sink, a urinal, a toilet basin, and a toilet space.

In an abnormality detection system according to an aspect of an embodiment, in a case where a tendency of a number of a use(s) per a predetermined time period for one use item that is one of a toilet booth, a lavatory sink, a urinal, a toilet basin, and a toilet space is separated from a use tendency thereof in past, it is possible to estimate that something happens in such one use item, so that it is possible to find an abnormality promptly by determining such an abnormality. Thus, an abnormality detection system detects an abnormality of a use item by comparison between a current use tendency of such a use item and a use tendency thereof in past, so that it is possible to detect an abnormality of a use item based on a difference between current and previous use tendencies of such a use item. Therefore, it is possible for an abnormality detection system to determine an abnormality concerning a use item of a toilet appropriately.

In the abnormality detection system according to one aspect of embodiments, the determination unit determines that an abnormality concerning the one use item occurs in a case where the number of a use(s) per a predetermined time period for the one use item falls below a threshold that is based on a number of a use(s) per a time period with a length that corresponds to the predetermined time period for the one use item in past.

In an abnormality detection system according to an aspect of an embodiment, in a case where a number of a use(s) per a predetermined time period for one use item falls below a threshold that is based on a number of a use(s) per a time period with a length that corresponds to a predetermined time period for the one use item in past, it is possible to estimate that something happens in such one use item, so that it is possible to find an abnormality promptly by determining such an abnormality. Therefore, it is possible for an abnormality detection system to determine an abnormality concerning a use item of a toilet appropriately.

In the abnormality detection system according to one aspect of embodiments, the acquisition unit acquires information that indicates a tendency of a number of a use(s) per a predetermined time period for another use item other than the one use item; and the determination unit determines that an abnormality concerning the one use item does not occur in a case where a tendency of the number of a use(s) of the another use item is separated from a use tendency of the another use item in past and a tendency of the number of a use(s) of the one use item is separated from a use tendency of the one use item in past.

In an abnormality detection system according to an aspect of an embodiment, in a case where a tendency of a number of a use(s) of another use item is separated from a use tendency of the another use item in past even in a case where a tendency of a number of a use(s) of one use item is separated from a use tendency of the one use item in past, it is possible to estimate that something else happens that is not an event that occurs in such a use item itself, so that it is possible to reduce a possibility that an abnormality is determined erroneously, by not determining an abnormality of the one use item. Thus, an abnormality detection system adds information of another use item other than one use item to abnormality determination for the one use item, so that it is possible to find an abnormality more accurately. Therefore, it is possible for an abnormality detection system to determine an abnormality concerning a use item of a toilet appropriately. For example, an abnormality detection system refers to a tendency of a number of a use(s) of another use item, so that it is possible to determine that it is not abnormal but normal in a case where a tendency of a number of a use(s) or a cumulative use time period a of another use item is also separated from a periodic tendency in past. In conventional abnormality detection, in a case where reduction of a user(s) occurs that is different from a tendency thereof in past and is not abnormal (a response in an emergency, an irregular holiday, etc.), an abnormality is determined erroneously. However, an abnormality detection system according to an aspect of an embodiment refers to a tendency of a number of a use(s) of another toilet instrument so as to determine whether it is really an abnormality, so that it is possible to reduce a possibility that an abnormality is determined erroneously.

In the abnormality detection system according to one aspect of embodiments, the acquisition unit acquires event information that includes a date and a time when a predetermined event occurs; and the determination unit determines that the abnormality concerning the one use item does not occur in a case where a determination time point for the abnormality corresponds to a date and a time that are indicated by the event information.

In an abnormality detection system according to an aspect of an embodiment, in a case where a determination time point for an abnormality corresponds to a date and a time when a predetermined event occurs, it is determined that an abnormality does not occur, so that it is possible to reduce a possibility that an abnormality is determined erroneously. Therefore, it is possible for an abnormality detection system to determine an abnormality concerning a use item of a toilet appropriately. For example, an abnormality detection system is capable of inputting event information thereto from an external interface, refers to such event information, and determines that it is not abnormal but normal in a case where a date and a time of an event overlap with a date and a time when it is separated (released) from a use tendency thereof in past. In conventional abnormality detection, if reduction of a user(s) occurs that is different from a tendency in past and is not abnormal (an irregular holiday, etc.), an abnormality is determined erroneously. However, an abnormality detection system according to an aspect of an embodiment refers to preliminarily set event information so as to determine whether it is really an abnormality, so that it is possible to reduce a possibility that an abnormality is determined erroneously.

In the abnormality detection system according to one aspect of embodiments, the determination unit determines whether or not an abnormality concerning the one use item occurs, based on a use tendency of the one use item in past except a date and a time that are indicated by the event information.

In an abnormality detection system according to an aspect of an embodiment, in a case where a tendency of a number of a use(s) per a predetermined time period for one use item is separated from a use tendency thereof in past except a date and a time when a predetermined event occurs, it is possible to estimate that something happens in such one use item, so that it is possible to find an abnormality promptly by determining such an abnormality. Thus, an abnormality detection system executes a determination process except information that may cause a negative influence on accuracy of abnormality determination, so that it is possible to reduce a possibility that an abnormality is determined erroneously and improve determination accuracy. Therefore, it is possible for an abnormality detection system to determine an abnormality concerning a use item of a toilet appropriately.

In the abnormality detection system according to one aspect of embodiments, the acquisition unit acquires information that indicates a tendency of a cumulative use time period per a predetermined time period for the one use item; and the determination unit determines that an abnormality concerning the one use item occurs in a case where a tendency of the cumulative use time period for the one use item is separated from a use tendency of the one use item in past.

In an abnormality detection system according to an aspect of an embodiment, in a case where a tendency of a cumulative use time period per a predetermined time period for one use item is separated from a use tendency of the one use item in past, it is possible to estimate that something happens in such one use item, so that it is possible to find an abnormality promptly by determining such an abnormality. Furthermore, for example, an abnormality detection system does not erroneously determine an abnormality for an event that is not abnormal and reduces a number of a user(s), such as a holiday and/or regular cleaning, differently from a conventional one, so that it is possible to find an abnormality accurately. Therefore, it is possible for an abnormality detection system to determine an abnormality concerning a use item of a toilet appropriately. Thus, an abnormality detection system compares a cumulative use time period for an instrument for a certain time period with a cumulative use time period thereof in past and determines an abnormality in a case where such a tendency is deviated.

In the abnormality detection system according to one aspect of embodiments, the one use item is one of a toilet booth, a lavatory sink, a urinal, a toilet basin, and a toilet space.

In an abnormality detection system according to an aspect of an embodiment, in a case where a tendency of a cumulative use time period per a predetermined time period for one use item that is one of a toilet booth, a lavatory sink, a urinal, a toilet basin, and a toilet space is separated from a use tendency thereof in past, it is possible to estimate that something happens in such one use item, so that it is possible to find an abnormality promptly by determining such an abnormality. Thus, an abnormality detection system detects an abnormality of a use item by comparison between a current use tendency of such a use item and a use tendency thereof in past, so that it is possible to detect an abnormality of a use item based on a difference between current and previous use tendencies of such a use item by determining an abnormality of such a use item. Therefore, it is possible for an abnormality detection system to determine an abnormality for a use item of a toilet appropriately.

In the abnormality detection system according to one aspect of embodiments, the determination unit determines that an abnormality concerning the one use item occurs in a case where the cumulative use time period per a predetermined time period for the one use item falls below a threshold that is based on a cumulative use time period per a time period with a length that corresponds to the predetermined time period for the one use item in past.

In an abnormality detection system according to an aspect of an embodiment, in a case where a cumulative use time period per a predetermined time period for one use item falls below a threshold that is based on a cumulative use time period per a time period with a length that corresponds to a predetermined time period for the one use item in past, it is possible to estimate that something happens in such one use item, so that it is possible to find an abnormality promptly by determining such an abnormality. Therefore, it is possible for an abnormality detection system to determine an abnormality concerning a use item of a toilet appropriately.

In the abnormality detection system according to one aspect of embodiments, the acquisition unit acquires information that indicates a tendency of a cumulative use time period per a predetermined time period for another use item other than the one use item; and the determination unit determines that an abnormality concerning the one use item does not occur in a case where a tendency of the cumulative use time period for the another use item is separated from a use tendency of the another use item in past and a tendency of the cumulative use time period for the one use item is separated from a use tendency of the one use item in past.

In an abnormality detection system according to an aspect of an embodiment, in a case where a tendency of a cumulative use time period for another use item is separated from a use tendency of the another use item in past even in a case where a tendency of a cumulative use time period for one use item is separated from a use tendency of the one use item in past, it is possible to estimate that something else happens that is not an event that occurs in such a use item itself, so that it is possible to reduce a possibility that an abnormality is determined erroneously by not determining an abnormality of the one use item. Thus, an abnormality detection system adds information of another use item other than one use item to abnormality determination for the one use item, so that it is possible to find an abnormality more accurately. Therefore, it is possible for an abnormality detection system to determine an abnormality concerning a use item of a toilet appropriately. For example, an abnormality detection system refers to a tendency of a cumulative use time period for another use item, so that it is possible to determine that it is not abnormal but normal in a case where a tendency of a cumulative use time period for another use item is also separated from a periodic tendency thereof in past. In conventional abnormality detection, in a case where reduction of a user(s) occurs that is different from a tendency in past and is not abnormal (a response in an emergency, an irregular holiday, etc.), an abnormality is determined erroneously. However, an abnormality detection system according to an aspect of an embodiment refers to a tendency of a cumulative use time period for another toilet instrument so as to determine whether it is really an abnormality, so that it is possible to reduce a possibility that an abnormality is determined erroneously.

In the abnormality detection system according to one aspect of embodiments, the acquisition unit acquires event information that includes a date and a time when a predetermined event occurs; and the determination unit determines that the abnormality concerning the one use item does not occur in a case where a determination time point for the abnormality corresponds to a date and a time that are indicated by the event information.

In an abnormality detection system according to an aspect of an embodiment, in a case where a determination time point for an abnormality corresponds to a date and a time when a predetermined event occurs, it is determined that an abnormality does not occur, so that it is possible to reduce a possibility that an abnormality is determined erroneously. Therefore, it is possible for an abnormality detection system to determine an abnormality concerning a use item of a toilet appropriately. For example, an abnormality detection system is capable of inputting event information thereto from an external interface, refers to such event information, and determines that it is not abnormal but normal in a case where a date and a time of an event overlap with a date and a time that are separated (released) from a use tendency in past. In conventional abnormality detection, if reduction of a user(s) occurs that is different from a tendency in past and is not abnormal (an irregular holiday, etc.), an abnormality is determined erroneously. However, an abnormality detection system according to an aspect of an embodiment refers to preliminarily set event information so as to determine whether it is really an abnormality, so that it is possible to reduce a possibility that an abnormality is determined erroneously.

In the abnormality detection system according to one aspect of embodiments, the determination unit determines whether or not an abnormality concerning the one use item occurs, based on a use tendency of the one use item in past except a date and a time that are indicated by the event information.

In an abnormality detection system according to an aspect of an embodiment, in a case where a tendency of a cumulative use time period per a predetermined time period for one use item is separated from a use tendency in past except a date and a time when a predetermined event occurs, it is possible to estimate that something happens in such one use item, so that it is possible to find an abnormality promptly by determining such an abnormality. Thus, an abnormality detection system executes a determination process except information that may cause a negative influence on accuracy of abnormality determination, so that it is possible to reduce a possibility that an abnormality is determined erroneously and improve determination accuracy. Therefore, it is possible for an abnormality detection system to determine an abnormality concerning a use item of a toilet appropriately.

SUMMARY

It is an object of the present invention to at least partially solve the problems in the conventional technology.

The above and other objects, features, advantages and technical and industrial significance of this invention will be better understood by reading the following detailed description of presently preferred embodiments of the invention, when considered in connection with the accompanying drawings.

BRIEF DESCRIPTION OF DRAWING(S)

DESCRIPTION OF EMBODIMENT(S)

Hereinafter, an embodiment(s) of an abnormality detection system as disclosed in the present application will be explained in detail, with reference to the accompanying drawing(s). Additionally, this invention is not limited by an embodiment(s) as illustrated below.

1. Embodiment 1-1. Abnormality Detection Process Example

Figure 1:
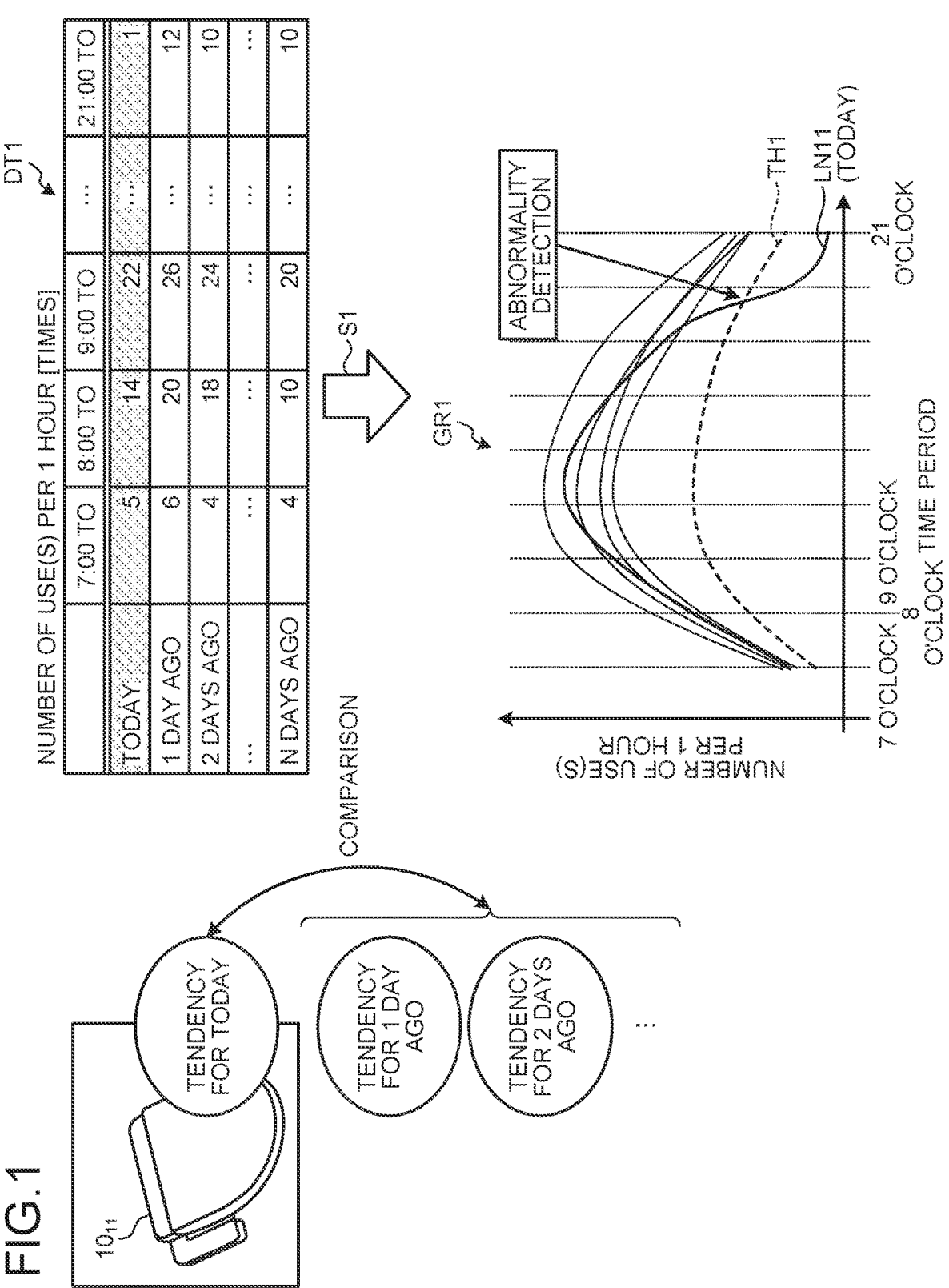
FIG. 1 is a diagram that illustrates an example of an abnormality detection process according to an embodiment.

First, an outline of abnormality detection that is executed in an abnormality detection system 1 according to an embodiment (see FIG. 3) will be explained with reference to FIG. 1. FIG. 1 is a diagram that illustrates an example of an abnormality detection process according to an embodiment. The abnormality detection system 1 determines that an abnormality concerning one use item occurs, in a case where a tendency of a usage state of one use item that is an item for use that is executed by a user of a toilet is separated from a use tendency of the one use item in past. In FIG. 1, for the abnormality detection system 1, although a case where a number of a use(s) per a predetermined time period for a use item is used as an example of a usage state of a use item will be explained as an example, such a usage state of a use item is not limited to such a number of a use(s) per a predetermined time period for a use item and may be any information that indicates a state of use of a use item, such as a cumulative use time period per a predetermined time period for a use item, where this point will be described later.

Figure 2:
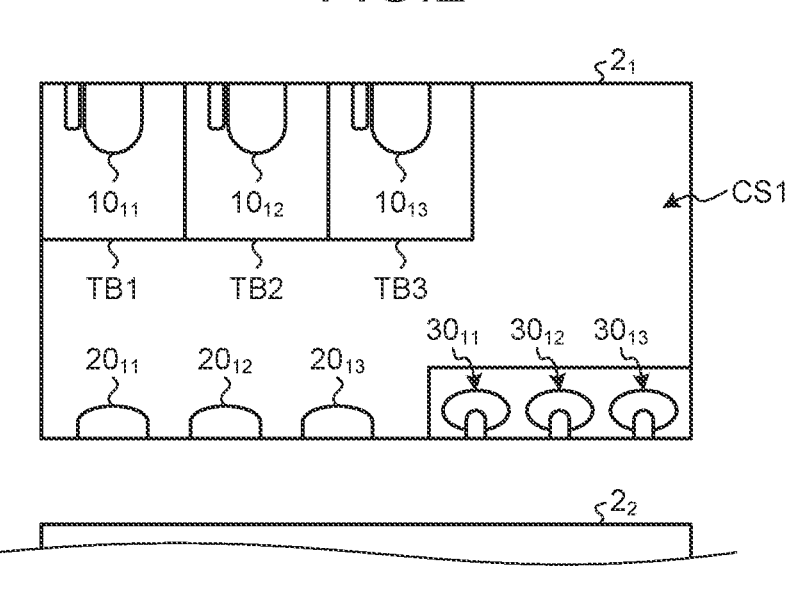
FIG. 2 is a diagram that illustrates an example of a utilization item of a toilet according to an embodiment.

In FIG. 1, a case will be explained where the abnormality detection system 1 executes abnormality determination for a toilet basin 10 as an item thereof. Additionally, an item of abnormality detection is not limited to the toilet basin 10 as long as it is a use item of a toilet, and may be a variety of use items of a toilet, such as a toilet space 2, a toilet booth TB where the toilet basin 10 is provided, a urinal 20, and a lavatory sink 30 as illustrated in FIG. 2, where a detail thereof will be described later.

Hereinafter, an example of a process as illustrated in FIG. 1 will be explained. Specifically, in FIG. 1, the abnormality detection system 1 executes abnormality determination for a toilet basin $10_{11}$ as an item thereof. For example, an analysis device 100 (see FIG. 3) of the abnormality detection system 1 executes a process as illustrated in FIG. 1. The analysis device 100 acquires information concerning use of the toilet basin $10_{11}$ that is provided as a detection item thereof.

The analysis device 100 acquires information that indicates a number of a use(s) of the toilet basin $10_{11}$ that is provided as a detection item thereof. For example, the analysis device 100 acquires information that indicates a time period when such a use item is used, for the toilet basin $10_{11}$. For example, the analysis device 100 acquires information that indicates a time period when such a use item is being used, for the toilet basin $10_{11}$. For example, the analysis device 100 acquires information that indicates a time period when a sensor (a detection unit) that corresponds to such a use item is detecting use thereof, for the toilet basin $10_{11}$.

The analysis device 100 counts, for one use item, a number of times that such one use item is being used, so as to calculate a number of a use(s) of the one use item. The analysis device 100 counts a number of times that one use item is being used, on a day (that will also be referred to as "today") that includes a date and a time at a process time point, so as to calculate a number of a use(s) of the one use item for today. The analysis device 100 counts a number of times that one use item is being used, for each predetermined time period for today, so as to calculate a number of a use(s) per a predetermined time period for the one use item for today. For example, the analysis device 100 counts a number of times that one use item is being used, for each hourly time zone within an hour after 7 o'clock (for example, between 7:00 and 8:00) within an hour after 8 o'clock, etc., today, so as to calculate a number of a use(s) per a predetermined time period for one use item for today.

In FIG. 1, the analysis device 100 counts a number of times that the toilet basin $10_{11}$ is being used for each time zone within an hour after 7 o'clock, within an hour after 8 o'clock, etc., today. Thereby, the analysis device 100 calculates a number of a use(s) per a predetermined time period for today, for the toilet basin $10_{11}$.

The analysis device 100 counts a number of times that one use item is being used, on a day(s) before today (in past), so as to calculate a number of a use(s) of the one use item in past. The analysis device 100 counts a number of times that one use item is being used, on a previous day (that will also be referred to as "1 day ago") for a day that includes a date and a time at a process time point, so as to calculate a number of a use(s) of the one use item for 1 day ago. The analysis device 100 counts a number of times that one use item is being used, for each predetermined time period for 1 day ago, so as to calculate a number of a use(s) per a predetermined time period for the one use item for 1 day ago. In FIG. 1, the analysis device 100 counts a number of times that the toilet basin $10_{11}$ is being used for each time zone within an hour after 7 o'clock, within an hour after 8 o'clock, etc., 1 day ago. Thereby, the analysis device 100 calculates a number of a use(s) per a predetermined time period for 1 day ago, for the toilet basin $10_{11}$.

The analysis device 100 counts a number of times that one use item is being used, on a day just before a previous day (that will also be referred to as "2 days ago") for a day that includes a date and a time at a process time point, so as to calculate a number of a use(s) of the one use item for 2 days ago. The analysis device 100 counts a number of times that one use item is being used, for each predetermined time period for 2 days ago, so as to calculate a number of a use(s) per a predetermined time period for the one use item for 2 days ago. In FIG. 1, the analysis device 100 counts a number of times that the toilet basin $10_{11}$ is being used, for each time zone within an hour after 7 o'clock, within an hour after 8 o'clock, etc., 2 days ago. Thereby, the analysis device 100 calculates a number of a use(s) per a predetermined time period for 2 day ago, for the toilet basin $10_{11}$.

Similarly, the analysis device 100 counts a number of times that one use item is being used, for each predetermined time period, on each day in past such as 3 days ago or 4 days ago for a day that includes a date and a time at a process time point, so as to calculate a number of a use(s) per a predetermined time period for one use item on each day in past. Additionally, past may be any time period such as 1 week or 1 month before a process time point. For example, in a case where information for 1 week in past is used, the analysis device 100 counts a number of times that one use item is being used, for each predetermined time period on each day in past, such as 1 day ago, 2 days ago, 3 days ago, 4 days ago, 5 days ago, 6 days ago, or 7 days ago for a day that includes a date and a time at a process time point. Thereby, the analysis device 100 calculates a number of a use(s) per a predetermined time period for one use item on each day in past, such as 1 day ago, 2 days ago, 3 days ago, 4 days ago, 5 days ago, 6 days ago, or 7 days ago.

In FIG. 1, the analysis device 100 produces information that indicates a number of a use(s) per 1 hour on each of days of today to N days ago, for the toilet basin $10_{11}$, as illustrated in aggregated data DT1.

The aggregated data DT1 indicate a number of a use(s) per 1 hour for the toilet basin $10_{11}$. For example, the aggregated data DT1 indicate that a number of a use(s) within an hour after 7 o'clock today is 5, a number of a use(s) within an hour after 8 o'clock today is 14, and a number of a use(s) within an hour after 9 o'clock today is 22. Furthermore, the aggregated data DT1 indicate that a number of a use(s) within an hour after 7 o'clock 1 day ago is 6, a number of a use(s) within an hour after 8 o'clock 1 day ago is 20, and a number of a use(s) within an hour after 9 o'clock 1 day ago is 26. Furthermore, the aggregated data DT1 indicate that a number of a use(s) within an hour after 7 o'clock 2 days ago is 4, a number of a use(s) within an hour after 8 o'clock 2 days ago is 18, and a number of a use(s) within an hour after 9 o'clock 2 days ago is 24.

Thus, the analysis device 100 aggregates a number of a use(s) for each time zone for each of a plurality of days for one use item. Thereby, the analysis device 100 uses a number of a use(s) per 1 hour for each of a plurality of days as indicated by a graph GR1 in FIG. 1, so that it is possible to execute determination based on a use tendency of one use item.

The graph GR1 in FIG. 1 indicates information concerning a number of a use(s) and a threshold for the toilet basin $10_{11}$ for each of today, 1 day ago, 2 days ago, ... N days ago. A horizontal axis of the graph GR1 indicates a time period and a vertical axis of the graph GR1 indicates a number of a use(s) per 1 hour. It is indicated that a number of a use(s)

is increased when moving in a plus (upward) direction of a vertical axis of the graph GR1. Each of solid lines in the graph GR1 corresponds to one of today to N days ago. Additionally, the graph GR1 in FIG. 1 illustrates only solid lines that correspond to some days among respective days of today to N days ago and only a solid line that corresponds to today is provided with a sign of "LN11". That is, a line LN11 in the graph GR1 indicates a number of a use(s) for each hour for today among respective days of today to N days ago for the toilet basin $10_{11}$ that is provided as an item thereof.

The analysis device 100 determines whether or not an abnormality for the toilet basin $10_{11}$ occurs, by using a number of a use(s) and a threshold for the toilet basin $10_{11}$ (step S1). In FIG. 1, the analysis device 100 sets a threshold from data of the toilet basin $10_{11}$. For example, the analysis device 100 sets a threshold for abnormality detection from information concerning a number of a use(s) of the toilet basin $10_{11}$. For example, the analysis device 100 calculates a threshold by using a number of a use(s) of the toilet basin $10_{11}$. In FIG. 1, the analysis device 100 calculates an average and a dispersion of numbers of a use(s) for respective days of today to N days ago and calculates a threshold by using a calculated average and dispersion of numbers of a use(s). For example, the analysis device 100 calculates, for each predetermined time period, an average and a dispersion of numbers of a use(s) for respective days of today to N days ago and calculates a threshold by using a calculated average and dispersion. For example, the analysis device 100 calculates an average and a dispersion of numbers of a use(s) within an hour after 7 o'clock for respective days of today to N days ago and calculates a threshold within an hour after 7 o'clock by using a calculated average and dispersion.

A line TH1 that is represented by a dotted line in the graph GR1 in FIG. 1 indicates a threshold for abnormality detection that is a value provided by subtracting a value provided by multiplying a standard deviation (SD: Standard Deviation) by 3 from an average of a number of a use(s) for respective days of today to N days ago. The analysis device 100 calculates a threshold for the toilet basin $10_{11}$ according to a calculation formula of "an average—3SD". Such a threshold is a threshold that is used to determine that an abnormality occurs in a case where a number of a use(s) of a user item falls below a value thereof. Additionally, a threshold as described above is merely an example and such a threshold may appropriately be set by using a variety of information. For example, information that is used for calculation of a threshold does not have to include information for today. In such a case, the analysis device 100 may calculate an average and a dispersion of a number of a use(s) for respective days of today to N days ago and calculate a threshold by using a calculated average and dispersion of a number of a use(s).

The analysis device 100 determines that an abnormality occurs in a use item in a case where a number of a use(s) of such a use item falls below a threshold. In FIG. 1, the analysis device 100 determines that an abnormality occurs in one use item in a case where a number of a use(s) of such one use item falls below a threshold, that is, a case where a number of a use(s) of such one use item is less than such a threshold.

In FIG. 1, a line LN1 that indicates a number of a use(s) of the toilet basin $10_{11}$ for today falls below a line TH1 that indicates a threshold, so that the analysis device 100 determines that an abnormality occurs in the toilet basin $10_{11}$ for today. For example, in determination after a line LN1 that indicates a number of a use(s) of the toilet basin $10_{11}$ for today falls below a line TH1 that indicates a threshold, the analysis device 100 determines that an abnormality occurs in the toilet basin $10_{11}$ for today. For example, a number of a use(s) within an hour after 19 o'clock today falls below a threshold, so that the analysis device 100 determines that an abnormality occurs in the toilet basin $10_{11}$ before 20 o'clock today.

As described above, the analysis device 100 acquires a number of a use(s) per 1 hour for one use item. Then, the analysis device 100 sets a threshold for abnormality detection (an average—3SD, etc.) based on a variation of a number of a use(s) in past. The analysis device 100 determines that an abnormality is present in a use item in a case where a number of a use(s) falls below a threshold. Thus, the analysis device 100 compares a number of a use(s) of one use item for a certain time period with a tendency in past and determines an abnormality in a case where such a tendency is deviated. For example, a basically similar utilization tendency is indicated in a PB toilet (a public toilet). Hence, it is possible for the analysis device 100 to detect an abnormality in a use item by comparing it with a tendency in past. For example, even if a number of a use(s) is reduced during night or by cleaning, a similar tendency is also indicated in past, so that it is possible for the analysis device 100 to reduce or prevent occurrence of erroneous detection of an abnormality by a process as described above.

1-1-1. Item for Abnormality Detection

Although a case where the abnormality detection system 1 executes abnormality determination for a toilet booth TB1 where the toilet basin $10_{11}$ is arranged as an example has been explained in an example as described above, an item for abnormality detection is not limited to the toilet basin $10_{11}$ and may be a variety of use items of a toilet, such as another toilet basin 10, a toilet space 2, a toilet booth TB where a toilet basin 10 is provided, a urinal 20, and a lavatory sink 30 as explained in FIG. 2. For example, a toilet basin 10 that is provided as an item is not limited to the toilet basin $10_{11}$ and may be a toilet basin $10_{12}$ or a toilet basin $10_{13}$ as illustrated in FIG. 2.

For example, the abnormality detection system 1 may execute abnormality detection for a urinal 20 such as a urinal $20_{11}$, a urinal $20_{12}$, or a urinal $20_{13}$ in FIG. 2 as an item. Furthermore, the abnormality detection system 1 may execute abnormality detection for a lavatory sink 30 such as a lavatory sink $30_{11}$, a lavatory sink $30_{12}$, or a lavatory sink $30_{13}$ in FIG. 2 as an item. Furthermore, the abnormality detection system 1 may execute abnormality detection for a toilet booth TB such as a toilet booth TB1, a toilet booth TB2, or a toilet booth TB3 in FIG. 2 as an item. Additionally, even if a use item that is provided as a determination item is other than the toilet basin 10, a determination process, etc., are similar to processes as illustrated in FIG. 1 where a detailed explanation thereof will be omitted.

1-1-2. Information that is Used for Determination Process

Additionally, information as described above is not a limitation and the abnormality detection system 1 may use a variety of information. The abnormality detection system 1 may use information of an occurring event. For example, the analysis device 100 may use information of an event in a space where a use item that is provided as a determination item is arranged. Additionally, an event as referred to herein may be any event as long as it is possible for such an event to influence accuracy of abnormality determination for a use item. For example, an event may be an abnormality in a whole of a space where a use item is arranged, or a special event or a holiday for a facility where a use item is provided.

Furthermore, for example, an event may be a periodic event such as regular cleaning, nighttime, or a weekend.

The analysis device 100 may acquire event information that includes a date and a time when a predetermined event occurs, and determine that an abnormality for one use item does not occur at a time point when such an abnormality is determined to occur in a case where such a time point corresponds to a date and a time that are indicated by the event information.

Furthermore, although FIG. 1 illustrates a case where information on each day in a date and time group of 1 day ago to N days ago for today (that will also be referred to as a "first date and time group") is used as information in past, information that is used in a determination process may be a variety of information. For example, the analysis device 100 may execute abnormality determination while information of a date and time group where a date that corresponds to an event is excluded from the first date and time group (that will also be referred to as a "second date and time group") is provided as information in past.

For example, in a case where an event occurs 3 days ago in a first date and time group that includes each of dates of today to 1 week ago, the analysis device 100 executes abnormality determination while a second date and time group where 3 days ago is excluded from the first date and time group is provided as past. For example, in FIG. 1, in a case where an event such as a power failure that is caused for a whole of the toilet space 2 where the toilet basin $10_{11}$ is arranged occurs 3 days ago, the analysis device 100 executes abnormality determination for the toilet basin $10_{11}$ while a second date and time group where 3 days ago is excluded from the first date and time group is provided as past. For example, in FIG. 1, in a case where an event that temporary closure of a facility where the toilet basin $10_{11}$ is provided is caused occurs 3 days ago, the analysis device 100 executes abnormality determination for the toilet basin $10_{11}$ while a second date and time group where 3 days ago is excluded from the first date and time group is provided as past. For example, in FIG. 1, in a case where 3 days ago corresponds to a day other than weekdays, such as Saturday or Sunday, the analysis device 100 executes abnormality determination for the toilet basin $10_{11}$ while a second date and time group where 3 days ago is excluded from the first date and time group is provided as past.

Furthermore, the analysis device 100 may execute abnormality determination by using information in past of only a day of week that corresponds to a day of week of today. For example, in a case where today is Saturday, the analysis device 100 may execute abnormality determination by using information on Saturday in past for today as information in past.

1-1-3. Another Example of Determination Process

Additionally, although a case where the abnormality detection system 1 executes abnormality determination for one use item by using only information of the one use item has been explained in an example as described above, information that is used for a determination process may be a variety of information. For example, the abnormality detection system 1 may execute abnormality determination for one use item by using information of another use item other than the one use item. For example, the abnormality detection system 1 may execute abnormality determination for one use item by using information of another use item that is arranged in a space that is identical to that of the one use item.

For example, the analysis device 100 may determine that an abnormality does not occur in one use item, in a case where a tendency of a number of a use(s) per a predetermined time period for another use item other than the one use item is separated from a use tendency of the another use item in past. For example, the analysis device 100 may determine that an abnormality concerning one use item does not occur, in a case where a tendency of a number of a use(s) per a predetermined time period for another use item other than the one use item is separated from a use tendency of the another use item in past and a case where a tendency of a number of a use(s) of the one use item is separated from a use tendency of the one use item in past. Thus, the analysis device 100 may determine that an abnormality in a whole of a space where a use item other than one use item is arranged is caused, in a case where it is determined that such a use item is also abnormal. In such a case, the analysis device 100 may determine that an abnormality concerning one use item does not occur.

In FIG. 1, for example, the analysis device 100 may determine that an abnormality does not occur in the toilet basin $10_{11}$, in a case where a tendency of a number of a use(s) per a predetermined time period for the toilet basin $10_{12}$ other than the toilet basin $10_{11}$ is separated from a use tendency of the toilet basin $10_{12}$ in past. For example, the analysis device 100 may determine that an abnormality concerning the toilet basin $10_{11}$ does not occur, in a case where a tendency of a number of a use(s) per a predetermined time period for the toilet basin $10_{12}$ other than the toilet basin $10_{11}$ is separated from a use tendency of the toilet basin $10_{12}$ in past and a case where a tendency of a number of a use(s) of the toilet basin $10_{11}$ is separated from a use tendency of the toilet basin $10_{11}$ in past. Thus, the analysis device 100 may determine that an abnormality in a whole of the toilet space $2_1$ where the toilet basin $10_{11}$ and the toilet basin $10_{12}$ are arranged is caused, in a case where it is determined that a use item other than the toilet basin $10_{11}$ is also abnormal. In such a case, the analysis device 100 may determine that an abnormality concerning the toilet basin $10_{11}$ does not occur.

Additionally, the above is merely an example, and the analysis device 100 may execute abnormality determination by using information of another use item other than one use item. For example, the analysis device 100 may determine that not an abnormality of an individual use item but an abnormality of a whole of the toilet space $2_1$ is caused, in a case where it is determined that all use items that are arranged in a whole of the toilet space $2_1$ are abnormal. For example, the analysis device 100 may determine that not an abnormality of an individual use item but an abnormality of a whole of the toilet space $2_1$ is caused, in a case where it is determined that a predetermined number (for example, 3, etc.) or more of a use item(s) among use items that are arranged in a whole of the toilet space $2_1$ is/are abnormal.

1-2. Utilization Item Example of Toilet

Hereinafter, an example of a utilization item of a toilet will be explained by using FIG. 2. FIG. 2 is a diagram that illustrates an example of a utilization item of a toilet according to an embodiment. FIG. 2 conceptually illustrates physical arrangement, etc., of a utilization item of a toilet. Additionally, a utilization item of a toilet as illustrated in FIG. 2 is merely an example, and such a utilization item of a toilet is an element concerning a toilet that is capable of being an item that is used by a user and may be any element as long as it is capable of being an item for abnormality detection.

As illustrated in FIG. 2, a utilization item of a toilet may include a toilet space such as a toilet space $2_1$ or a toilet space $2_2$. The toilet space $2_1$ as illustrated in FIG. 2 has toilet booths TB1 to TB3 that are toilet booths that form a restroom stall space and a common space CS1 that is a common space that is a space other than such toilet booths. Additionally, in a case where toilet booths that are provided in a toilet space 2, such as the toilet booth TB1, the toilet booth TB2, and the toilet booth TB3 are explained without distinction, they may be described as "toilet booths TB".

Additionally, in a case where toiles spaces such as the toilet space $2_1$ and the toilet space $2_2$ are explained without distinction, they may be described as "toilet spaces 2". Although FIG. 2 illustrates two toilet spaces 2 that are the toilet space $2_1$ and the toilet space $2_2$, a utilization item of a toilet may include three or more toilet spaces 2. Although FIG. 2 explains, as an example, a case where the toilet space 2 has three toilet booths TB, the toilet space 2 may have two or less or four or more toilet booths TB.

That is, the toilet space $2_1$ as illustrated in FIG. 2 is merely an example of the toilet space 2, it is possible to adopt any configuration for the toilet space 2. For example, the toilet space 2 may be configured to have one toilet booth TB. The toilet space 2 may have any configuration as long as at least one use item of a toilet that is capable of being used by a user is included therein. For example, the toilet space 2 may have any configuration as long as it has at least one of instruments (toilet instruments) such as a toilet basin 10, a urinal 20, and a lavatory sink 30.

A toilet booth TB is a space (an restroom stall space) that is partitioned by a partition (a partition wall). Each toilet booth TB includes the toilet basin 10 and has a function of a place where a person executes his or her excretory behavior. Furthermore, each toilet booth TB includes an openable and closable door (where illustration thereof is omitted) for entering such a toilet booth TB. Additionally, a door of each toilet booth TB is similar to a door that is provided for a general toilet booth TB where a detailed explanation thereof will be omitted. Furthermore, the toilet booth TB does not have to be a space that is completely partitioned by a partition and a part that is not separated from an adjacent toilet booth TB or a common space may be provided above or below such a partition.

Furthermore, in a case where common spaces that are provided in the toilet space 2, such as a common space CS1, are explained without distinction, they may be described as "common spaces CS". A common space CS is a common part where a plurality of persons are capable of staying simultaneously in the toilet space 2. For example, the common space CS has an entrance of the toilet space 2, a lavatory facility such as the lavatory sink 30, and a route to each toilet booth TB. The common space CS has a function as a place for executing entry to the toilet space 2, washing of a hand(s), etc., movement to each toilet booth TB, etc. Additionally, in a case where the toilet space 2 functions as a toilet space 2 for gentlemen, the urinal 20 is arranged in such a common space CS. That is, the common space CS may also function as a place where a person executes his or her excretory behavior.

Next, while the toilet space $2_1$ as illustrated in FIG. 2 will be explained as an example, arrangement of each device in the toilet space 2 will be explained. The toilet basin $10_{11}$ is arranged in the toilet booth TB1. Furthermore, the toilet basin $10_{12}$ is arranged in the toilet booth TB2. Furthermore, the toilet basin $10_{13}$ is arranged in the toilet booth TB3. Additionally, in a case where toilet basins such as the toilet basin $10_{11}$, the toilet basin $10_{12}$, and the toilet basin $10_{13}$ are explained without distinction, they may be described as "toilet basins 10".

Although FIG. 2 illustrates a case where a number of the toilet basins 10 is three as an example, it is possible to adopt any number for a number of the toilet basin(s) 10 as long as a desired process is possible, and such a number of the toilet basin(s) 10 may be two or less or four or more. Additionally, a detail of a function, etc., of a toilet basin 10 will be described later. Furthermore, a description(s) for explaining the toilet basin 10 as an item for a process such as collection of information or determination may be read as a toilet booth TB where such a toilet basin 10 is arranged. Furthermore, a description(s) for explaining the toilet booth TB as an item for a process such as collection of information or determination may be read as a toilet basin 10 that is arranged in such a toilet booth TB. For example, the toilet basin $10_{11}$ may be read as the toilet booth TB1 and the toilet booth TB1 may be read as the toilet basin $10_{11}$.

A urinal $20_{11}$, a urinal $20_{12}$, and a urinal $20_{13}$ are arranged in the common space CS1. In a case where urinals that are arranged in the toilet space 2 such as the urinal $20_{11}$, the urinal $20_{12}$, and the urinal $20_{13}$ are explained without distinction, they may be described as "urinals 20". Although FIG. 2 illustrates a case where a number of urinals 20 is three as an example, it is possible to adopt any number for a number of the urinal(s) 20 as long as a desired process is possible, and such a number of the urinal(s) 20 may be two or less or four or more. Additionally, a detail of a function, etc., of a urinal 20 will be described later.

A lavatory sink $30_{11}$, a lavatory sink $30_{12}$, and a lavatory sink $30_{13}$ are arranged in the common space CS1. In a case where lavatory sinks that are arranged in the toilet space 2, such as the lavatory sink $30_{11}$, the lavatory sink $30_{12}$, and the lavatory sink $30_{13}$, are explained without distinction, they may be described as "lavatory sinks 30". Although FIG. 2 illustrates a case where a number of lavatory sinks 30 is three as an example, it is possible to adopt any number for a number of the lavatory sink(s) 30 as long as a desired process is possible, and such a number of the lavatory sink(s) 30 may be two or less or four or more. Additionally, a detail of a function, etc., of a lavatory sink 30 will be described later.

1-3. Arrangement of Toilet Space

Arrangement of the toilet space 2 will be explained simply. The toilet space 2 may be provided in any place as long as it is a space that is capable of arranging such a toilet space 2 physically. That is, it is possible to adopt any place for a place where the toilet space 2 is provided. For example, the toilet space 2 may be provided in a commercial facility such as a department (a department store). Furthermore, a place where the toilet space 2 is provided is not limited to a commercial facility such as a store and may be a variety of facilities. For example, a place where the toilet space 2 is provided may be an amusement park, a stadium, an office building, etc. For example, a place where the toilet space 2 is provided may be a toilet that is provided in a region such as a tourist destination. For example, a place where the toilet space 2 is provided may be a park, a parking space, etc. That is, a toilet may be provided at an outdoor location such as a park or a parking space. Thus, a place where the toilet space 2 is provided may be any place as long as it is a space that is capable of arranging the toilet space 2.

1-4. Configuration of Abnormality Detection System

Figure 3:
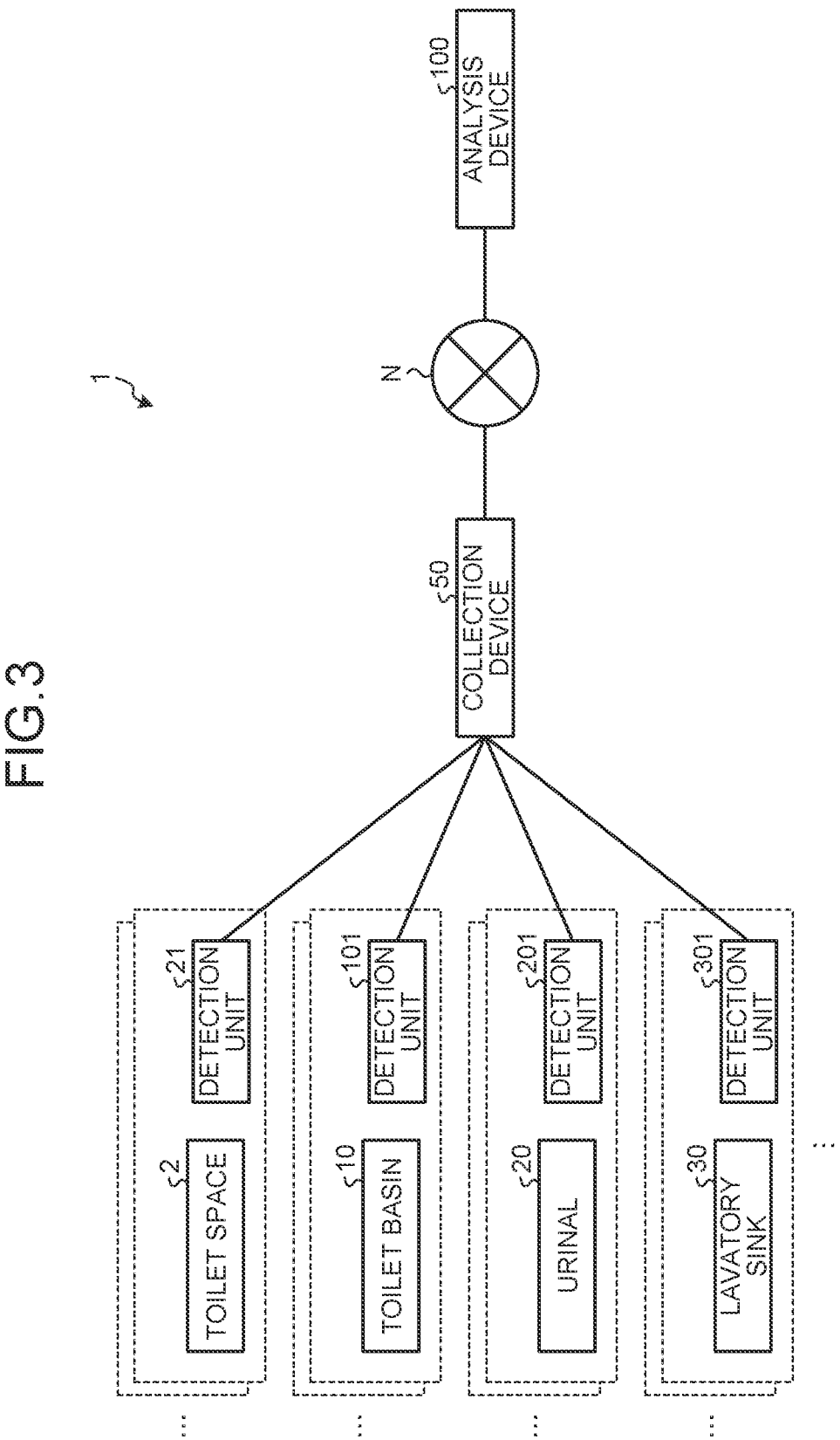
FIG. 3 is a diagram that illustrates a configuration example of an abnormality detection system according to an embodiment.

Next, a configuration of an abnormality detection system 1 will be explained with reference to FIG. 3. FIG. 3 is a diagram that illustrates a configuration example of an abnormality detection system according to an embodiment. Specifically, FIG. 3 illustrates a configuration of an abnormality detection system 1.

The abnormality detection system 1 has an information processing apparatus (an analysis device 100 in FIG. 3) that executes a process for abnormality detection. Furthermore, the abnormality detection system 1 has an information processing apparatus (a collection device 50 in FIG. 3) that collects information that is used for a process for abnormality detection. The abnormality detection system 1 as illustrated in FIG. 3 has an analysis device 100, a collection device 50, a detection unit 21, a detection unit 101, a detection unit 201, and a detection unit 301. Additionally, the abnormality detection system 1 may include a plurality of analysis devices 100, a plurality of collection devices 50, a plurality of detection units 21, a plurality of detection units 101, a plurality of detection units 201, a plurality of detection units 301, etc.

In FIG. 3, a use item of a toilet that is provided as an item for abnormality detection for the abnormality detection system 1 includes at least one of a toilet space 2, a toilet basin 10, a urinal 20, and a lavatory sink 30. Additionally, as illustrated in FIG. 2, a use item of a toilet that is provided as an item for abnormality detection for the abnormality detection system 1 may include a plurality of toilet spaces 2, a plurality of toilet basins 10, a plurality of urinals 20, a plurality of lavatory sinks 30, etc.

The toilet space 2 is provided in a space of a facility, etc., and is a space where a user that uses a toilet enters and exits. For example, the toilet space 2 has a toilet booth TB, a common space CS, etc., and is a space where a structure concerning a toilet is arranged. For example, the toilet space $2_1$ as illustrated in FIG. 2 has toilet booths TB1 to TB3 where a plurality of toilet basins $10_{11}$, $10_{12}$, $10_{13}$ are arranged respectively, and a common space CS1 where a plurality of urinals $20_{11}$, $20_{12}$, $20_{13}$ and a plurality of lavatory sinks $30_{11}$, $30_{12}$, $30_{13}$ are arranged. Additionally, the toilet space 2 does not have to be included in the abnormality detection system 1.

The detection unit 21 of the toilet space 2 executes detection concerning the toilet space 2. The detection unit 21 functions as a detection unit that detects entry and exit of a person (a user) for the toilet space 2. The detection unit 21 may be realized by a variety of sensors. For example, the detection unit 21 may be a variety of sensors such as a human body detection sensor, a behavior detection sensor, and a presence detection sensor. The detection unit 21 may be an image sensor (a behavior detection sensor) that captures an image of an entrance and/or an exit of the toilet space 2. Additionally, the above is an example, and the detection unit 21 may be realized by any means as long as it is capable of detecting entry and/or exit of a user for the toilet space 2.

The detection unit 21 of the toilet space 2 includes, for example, a communication unit (for example, a communication circuit, etc.) that has a wireless communication function, and is wirelessly connected to the collection device 50 so as to be communicable therewith. For example, in a case where entry and/or exit of a person for the toilet space 2 is/are detected, the detection unit 21 transmits detection information that indicates such detection, a date and a time of detection, etc., together with identification information (ID, etc.) that identifies such a toilet space 2, to the collection device 50. For example, the detection unit 21 transmits detection information that indicates a time period (a use time period) from entry of a person to the toilet space 2 to exit thereof, together with identification information (ID, etc.) that identifies such a toilet space 2, to the collection device 50. Additionally, in a case where the toilet space 2 is not included in an item for abnormality detection for the abnormality detection system 1, the abnormality detection system 1 does not have to include the detection unit 21.

The toilet basin 10 is a use item of a toilet that is used when a user that uses a toilet excretes feces or urine, etc. The toilet basin 10 is arranged in the toilet booth TB that is provided in the toilet space 2. For example, the toilet basin 10 has a toilet seat device that includes a toilet seat where a user is seated, and an operation unit for operating a nozzle for spouting water for washing. The toilet basin 10 also has a variety of configurations for realizing a function as a toilet basin, such as a toilet seat cover or a toilet bowl, other than a toilet seat device where a detailed explanation thereof will be omitted. Additionally, the toilet basin 10 does not have to be included in the abnormality detection system 1.

The detection unit 101 of the toilet basin 10 executes detection concerning the toilet basin 10. The detection unit 101 of the toilet basin 10 executes detection concerning the toilet booth TB where the toilet basin 10 is arranged. The detection unit 101 functions as a detection unit that detects entry and/or exit of a person (a user) for the toilet booth TB where the toilet basin 10 is arranged. The detection unit 101 may be realized by a variety of sensors. For example, the detection unit 101 may be a variety of sensors such as a human body detection sensor, a behavior detection sensor, and a seating detection sensor. The detection unit 101 is provided on a door, etc., of the toilet booth TB, and may be a door sensor that detects opening and closing of such a door of the toilet booth TB. The detection unit 101 may be an image sensor that captures an image near a door of the toilet booth TB. The detection unit 101 may be a seating sensor that detects seating of a user on the toilet basin 10. Additionally, the above is an example, and the detection unit 101 may be realized by any means as long as it is capable of detecting entry and/or exit of a user for the toilet basin 10. Additionally, the toilet basin 10 and the detection unit 101 may be integrated. In such a case, the toilet basin 10 that has the detection unit 101 may be included in the abnormality detection system 1. Additionally, an arrangement position of the detection unit 101 is not particularly limited and it may be installed on a ceiling, a wall surface, a floor, etc., of the toilet booth TB or may be mounted on a toilet seat of the toilet basin 10.

The detection unit 101 of the toilet basin 10 includes, for example, a communication unit (for example, a communication circuit, etc.) that has a wireless communication function, and is wirelessly connected to the collection device 50 so as to be communicable therewith. For example, in a case where entry and/or exit of a person for the toilet booth TB where the toilet basin 10 is arranged is/are detected, the detection unit 101 transmits detection information that indicates such detection, a date and a time of detection, etc., together with identification information (ID, etc.) that identifies such a toilet basin 10 or the toilet booth TB where the toilet basin 10 is arranged, to the collection device 50. For example, the detection unit 21 transmits detection information that indicates a time period (a use time period) from entry of a person to the toilet booth TB where the toilet basin 10 is arranged to exit thereof, together with identification information (ID, etc.) that identifies such a toilet basin 10 or the toilet booth TB where the toilet basin 10 is arranged, to the collection device 50. Additionally, in a case where the toilet basin 10 is not included in an item for abnormality detection for the abnormality detection system 1, the abnormality detection system 1 does not have to include the detection unit 101.

The urinal 20 is provided in the toilet space 2 for gentlemen and is a use item of a toilet that is used when a user that uses a toilet excretes urine. The urinal 20 is arranged in the common space CS that is provided in the toilet space 2. Additionally, the urinal 20 does not have to be included in the abnormality detection system 1.

The detection unit 201 of the urinal 20 executes detection concerning the urinal 20. The detection unit 201 functions as a detection unit that detects use of the urinal 20 by a person (a user). The detection unit 201 may be realized by a variety of sensors. For example, the detection unit 201 may be a variety of sensors such as a human body sensor, a behavior detection sensor, and a presence detection sensor. The detection unit 201 may be a proximity sensor that detects proximity of a person to the urinal 20. Additionally, the above is an example and the detection unit 201 may be realized by any means as long as it is capable of detecting use of the urinal 20 by a user. Additionally, the urinal 20 and the detection unit 201 may be integrated. In such a case, the urinal 20 that has the detection unit 201 may be included in the abnormality detection system 1. For example, the detection unit 201 is provided on a front surface of the urinal 20 and detects a person that is located in front of the urinal 20. Additionally, an arrangement position of the detection unit 201 is not particularly limited and may be installed on a ceiling, a wall surface, a floor, etc., of the common space CS.

The detection unit 201 of the urinal 20 includes, for example, a communication unit (for example, a communication circuit, etc.) that has a wireless communication function, and is wirelessly connected to the collection device 50 so as to be communicable therewith. For example, in a case where use of the urinal 20 by a person is detected, the detection unit 201 transmits detection information that indicates such detection, a date and a time of detection, etc., together with identification information (ID, etc.) that identifies such a urinal 20, to the collection device 50. For example, the detection unit 21 transmits detection information that indicates a time period (a use time period) during use by a person (for example, after a person approaches the urinal 20 and before he moves away therefrom), together with identification information (ID, etc.) that identifies such a urinal 20, to the collection device 50. Additionally, in a case where the urinal 20 is not included in an item for abnormality detection for the abnormality detection system 1, the abnormality detection system 1 does not have to include the detection unit 201.

The lavatory sink 30 is a use item of a toilet that is used when a user that uses a toilet washes his or her hand(s), washes his or her face, or looks in a mirror. The lavatory sink 30 is arranged in the common space CS that is provided in the toilet space 2. For example, the lavatory sink 30 has a tap that has a function of an automatic water tap and a bowl part that receives water from such a tap. Additionally, the lavatory sink 30 does not have to be included in the abnormality detection system 1.

The detection unit 301 of the lavatory sink 30 executes detection concerning the lavatory sink 30. The detection unit 301 functions as a detection unit that detects use of the lavatory sink 30 by a person (a user). The detection unit 301 may be realized by a variety of sensors. For example, the detection unit 301 may be a variety of sensors such as a human body detection sensor, a behavior detection sensor, and a presence detection sensor. The detection unit 301 may be a proximity sensor that detects proximity of a body of a person to the lavatory sink 30. Additionally, the above is an example and the detection unit 301 may be realized by any means as long as it is capable of detecting use of the lavatory sink 30 by a user. Additionally, the lavatory sink 30 and the detection unit 301 may be integrated. In such a case, the lavatory sink 30 that has the detection unit 301 may be included in the abnormality detection system 1. For example, the detection unit 301 is provided near a tap of the lavatory sink 30 and detects proximity of a hand(s) of a person to such a tap of the lavatory sink 30. Additionally, arrangement position of the detection unit 301 is not particularly limited and may be installed on a ceiling, a wall surface, a floor, etc., of the common space CS.

The detection unit 301 of the lavatory sink 30 includes, for example, a communication unit (for example, a communication circuit, etc.) that has a wireless communication function, and is wirelessly connected to the collection device 50 so as to be communicable therewith. For example, in a case where use of the lavatory sink 30 by a person is detected, the detection unit 301 transmits detection information that indicates such detection, a date and a time of detection, etc., together with identification information (ID, etc.) that identifies such a lavatory sink 30, to the collection device 50. For example, the detection unit 301 transmits detection information that indicates a time period (a use time period) during use by a person (for example, during spouting of water from a tap of the lavatory sink 30), together with identification information (ID, etc.) that identifies such a lavatory sink 30, to the collection device 50. Additionally, in a case where the lavatory sink 30 is not included in an item for abnormality detection for the abnormality detection system 1, the abnormality detection system 1 does not have to include the detection unit 301.

The collection device 50 collects a variety of information. For example, the collection device 50 may be a gateway device, etc. The collection device 50 is a device that collects detection information such as sensor data that are detected for each use item. The collection device 50 collects information from another device. The collection device 50 collects detection information that is information that is detected for the toilet space 2, the toilet basin 10, the urinal 20, and the lavatory sink 30, etc. The collection device 50 receives detection information from a device that detects information, such as the toilet space 2, the toilet basin 10, the urinal 20, and the lavatory sink 30.

The collection device 50 receives a result of detection of the toilet space 2 from the detection unit 21 of the toilet space 2. The collection device 50 receives detection information of the toilet basin 10 from the detection unit 101 of the toilet basin 10. The collection device 50 receives detection information of the urinal 20 from the detection unit 201 of the urinal 20. The collection device 50 receives detection information of the lavatory sink 30 from the detection unit 301 of the lavatory sink 30. The collection device 50 is wirelessly connected to the detection unit 21 of the toilet space 2, the detection unit 101 of the toilet basin 10, the detection unit 201 of the urinal 20, and the detection unit 301 of the lavatory sink 30 so as to be communicable therewith. Additionally, the collection device 50 may be connected to a device that detects information, such as the toilet space 2, the toilet basin 10, the urinal 20, and the lavatory sink 30, in any way, as long as transmission and receipt of information are possible, and may be connected thereto by wire so as to be communicable therewith.

The collection device 50 may be arranged outside the toilet space 2 or may be arranged inside the toilet space 2. For example, the collection device 50 may be a server device that is arranged in a facility where the toilet space 2 is provided, etc. Additionally, the above is merely an example, and it is possible to adopt any form for a device configuration and arrangement of the collection device 50 as long as it is capable of communicating with the detection unit 21, the detection unit 101, the detection unit 201, and the detection unit 301, collecting information therefrom, and transmitting collected information to the analysis device 100. Furthermore, the collection device 50 may be integrated with the analysis device 100. In such a case, the analysis device 100 has a function of the collection device 50, so that the analysis device 100 collects information of a use item such as the toilet space 2, the toilet basin 10, the urinal 20, and the lavatory sink 30.

The analysis device 100 is an information processing apparatus (a computer) that executes a determination process that determines whether or not an abnormality concerning a use item of a toilet occurs. For example, the analysis device 100 may be a cloud server, etc. The analysis device 100 is connected to the collection device 50 wirelessly or by wire through a predetermined network N such as the Internet so as to be communicable therewith. Additionally, the analysis device 100 may be connected to the collection device 50 in any way as long as transmission and receipt of information are possible, and may be connected thereto wirelessly so as to be communicable therewith or may be connected thereto by wire so as to be communicable therewith.

The analysis device 100 executes a determination process that determines whether or not an abnormality concerning a use item of a toilet occurs, by using information that is collected by the collection device 50. The analysis device 100 executes a determination process that determines whether or not an abnormality concerning a use item of a toilet occurs, by using collection information that is information that is received from the collection device 50. The analysis device 100 determines whether or not an abnormality concerning the toilet space 2 occurs, by using collection information. The analysis device 100 determines whether or not an abnormality concerning the toilet basin 10 occurs, by using collection information. The analysis device 100 determines whether or not an abnormality concerning the urinal 20 occurs, by using collection information. The analysis device 100 determines whether or not an abnormality concerning the lavatory sink 30 occurs, by using collection information.

1-5. Functional Configuration of Analysis Device

Figures 4, 5:
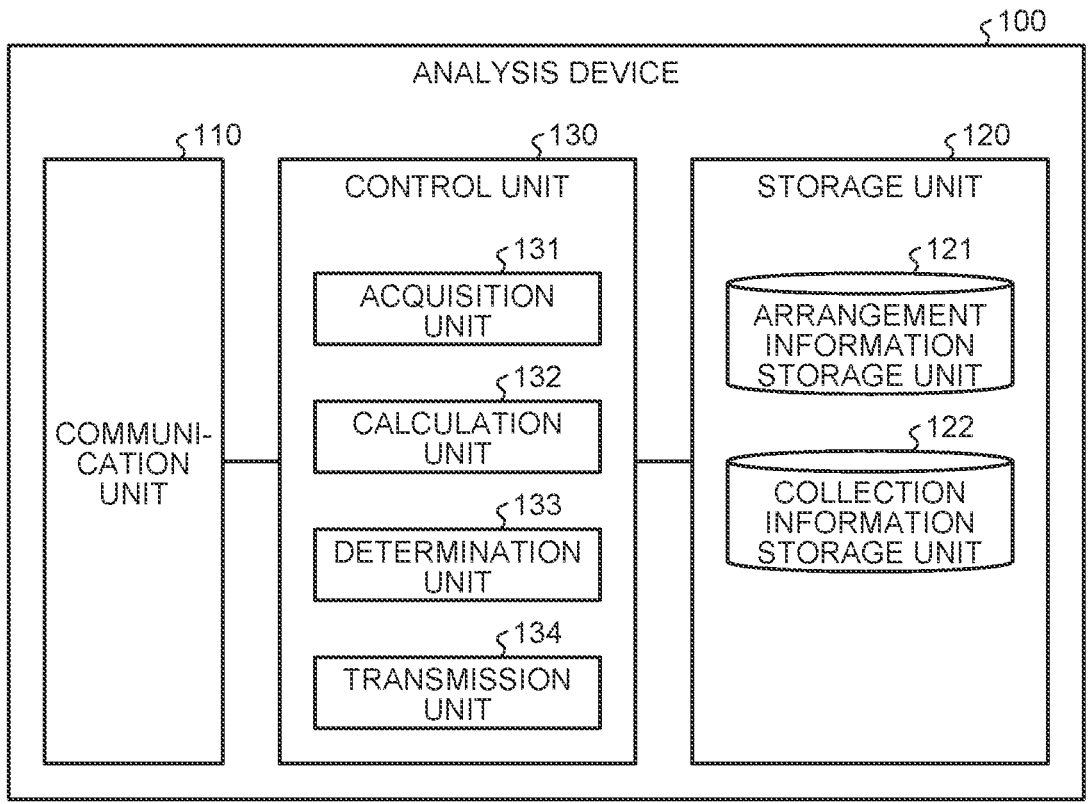
FIG. 4 is a block diagram that illustrates an example of a configuration of an analysis device according to an embodiment.
FIG. 5 is a diagram that illustrates an example of an arrangement information storage unit according to an embodiment.

Hereinafter, a functional configuration of an analysis device will be explained with reference to FIG. 4. FIG. 4 is a block diagram that illustrates an example of a configuration of an analysis device according to an embodiment.

As illustrated in FIG. 4, an analysis device 100 has a communication unit 110, a storage unit 120, and a control unit 130. Additionally, the analysis device 100 may have an input unit (for example, a keyboard, a mouse, etc.) that receives a variety of operations from a manager, etc., for the analysis device 100 and/or a display unit (for example, a liquid crystal display, etc.) for displaying a variety of information.

The communication unit 110 is realized by, for example, a communication circuit, etc. The communication unit 110 is connected to a predetermined network N (see FIG. 3) by wire or wirelessly and executes transmission and receipt of information for an external information processing apparatus. For example, the communication unit 110 is connected to a predetermined network N (see FIG. 3) by wire or wirelessly and executes transmission and receipt of information for another device such as the collection device 50.

The storage unit 120 is realized by, for example, a semiconductor memory such as a RAM (Ransom Access Memory) or a flash memory, or a storage device such as a hard disk or an optical disk. For example, the storage unit 120 is a computer-readable recording medium that nontransitorily records data, etc., that are used by an abnormality detection program, etc., such as a determination process.

The storage unit 120 according to an embodiment has an arrangement information storage unit 121 and a collection information storage unit 122, as illustrated in FIG. 4. Additionally, the storage unit 120 is not limited to the arrangement information storage unit 121 and the collection information storage unit 122 and stores a variety of information that is needed for a process. For example, the storage unit 120 stores a variety of information that is used for a determination process (for example, information concerning a threshold). For example, the storage unit 120 stores a function for calculating a threshold that is used for a determination process and information of a calculated threshold.

The arrangement information storage unit 121 according to an embodiment stores a variety of information concerning arrangement of a variety of use items that are provided as a detection item for an abnormality detection system 1. For example, the arrangement information storage unit 121 stores information concerning arrangement of the toilet space 2, the toilet basin 10, the urinal 20, and the lavatory sink 30. FIG. 5 is a diagram that illustrates an example of an arrangement information storage unit according to an embodiment. The arrangement information storage unit 121 as illustrated in FIG. 5 includes items of "FACILITY", "TOILET SPACE", "ARRANGEMENT LOCATION", and "ARRANGEMENT ELEMENT".

"FACILITY" indicates a place where a toilet space is arranged. Additionally, "FACILITY" is not limited to a structure and is capable of registering a variety of places as long as it is a place where a toilet space is arranged. "TOILET SPACE" indicates identification information for identifying each toilet space. Although FIG. 5 illustrates a sign that is provided to each toilet spaces such as "$2_1$" or "$2_2$" in "TOILET SPACE" for an explanation, "TOILET SPACE" stores information that is capable of specifying a toilet space (for example, a toilet space ID, etc.).

"ARRANGEMENT LOCATION" indicates identification information for identifying each arrangement location. Although FIG. 5 illustrates a sign that is provided to each configuration of the toilet space 2 such as "TB1", "TB2", "TB3", or "CS1" in "ARRANGEMENT LOCATION" for an explanation, "ARRANGEMENT LOCATION" stores information that is capable of specifying arrangement location (for example, an arrangement location ID, etc.).

"ARRANGEMENT ELEMENT" indicates identification information for identifying a use item of a toilet that is arranged at a corresponding arrangement location. For example, "ARRANGEMENT ELEMENT" indicates identification information for identifying a use item of a toilet such as the toilet basin 10, the urinal 20, and the lavatory sink 30 that are arranged at corresponding arrangement locations. Although FIG. 5 illustrates a sign that is provided to each configuration, such as "$10_{11}$", "$10_{12}$", "$10_{13}$", "$20_{11}$", "$20_{12}$", "$20_{13}$", "$30_{11}$", "$30_{12}$", or "$30_{13}$" in "ARRANGEMENT ELEMENT" for an explanation, "ARRANGEMENT ELEMENT" may register any information as long as it is capable of identifying each use item.

For example, "ARRANGEMENT ELEMENT" stores information that is capable of specifying a toilet basin that is arranged at a corresponding arrangement location (for example, a toilet basin ID, etc.), identification information for identifying a urinal (for example, a urinal ID, etc.), or identification information for identifying a lavatory sink (for example, a lavatory sink ID, etc.).

An example of FIG. 5 indicates that the toilet booth TB1 that is identified by "TB1", the toilet booth TB2 that is identified by "TB2", and the toilet booth TB3 that is identified by "TB3" as arrangement locations are included in the toilet space $2_1$ that is identified by "$2_1$". Furthermore, it is indicated that the common space CS1 that is identified by "CS1" as an arrangement location is included in the toilet space $2_1$.

It is indicated that the toilet basin $10_{11}$ that is identified by "$10_{11}$" is arranged in the toilet booth TB1 that is an arrangement location that is identified by "TB1". Furthermore, it is indicated that the toilet basin $10_{12}$ that is identified by "$10_{12}$" is arranged in the toilet booth TB2 that is an arrangement location that is identified by "TB2". Furthermore, it is indicated that the toilet basin $10_{13}$ that is identified by "$10_{13}$" is arranged in the toilet booth TB3 that is an arrangement location that is identified by "TB3".

Furthermore, it is indicated that the urinal $20_{11}$ that is identified by "$20_{11}$", the urinal $20_{12}$ that is identified by "$20_{12}$", and the urinal $20_{13}$ that is identified by "$20_{13}$" are arranged in the common space CS1 that is an arrangement location that is identified by "CS1". Furthermore, it is indicated that the lavatory sink $30_{11}$ that is identified by "$30_{11}$", the lavatory sink $30_{12}$ that is identified by "$30_{12}$", and the lavatory sink $30_{13}$ that is identified by "$30_{13}$" are arranged in the common space CS1.

Additionally, the arrangement information storage unit 121 is not limited to the above and may store a variety of information according to a purpose. For example, the arrangement information storage unit 121 associates and stores information (for example, a sensor ID, etc.) that is capable of specifying a sensor (a detection unit) that detects sensor data (detection information) of each use item that is provided as a detection item with a use item that is detected by such a sensor.

Information (for example, latitude longitude information, etc.) that indicates a specific arrangement position of each use item of a toilet may be associated and stored with each use item of a toilet. For example, information (for example, latitude longitude information, etc.) that indicates a specific arrangement position of each toilet space 2 may be associated and stored with each toilet space 2. For example, information (for example, latitude longitude information, etc.) that indicates a specific arrangement position of each toilet basin 10 may be associated and stored with each toilet basin 10. For example, the arrangement information storage unit 121 may associate and store information that is detected by each urinal 20 and/or information (for example, latitude longitude information, etc.) that indicates a specific arrangement position of each urinal 20 with each urinal 20. For example, the arrangement information storage unit 121 may associate and store information that is detected by each lavatory sink 30 and/or information (for example, latitude longitude information, etc.) that indicates a specific arrangement position of each lavatory sink 30 with each lavatory sink 30.

The collection information storage unit 122 stores detection information such as sensor data that are collected for each use item of a toilet. The collection information storage unit 122 stores information that is received from the collection device 50. The collection information storage unit 122 stores detection information that is detected by the detection unit 21, the detection unit 101, the detection unit 201, and the detection unit 301. For example, the collection information storage unit 122 associates and stores a use history of each use item of a toilet with information that identifies each use item of a toilet.

For example, the collection information storage unit 122 associates and stores a date and a time when each use item of a toilet is used with information that identifies each use item of a toilet. The collection information storage unit 122 associates and stores a date and a time when each toilet basin 10 is used with information that identifies each toilet basin 10. The collection information storage unit 122 associates and stores a date and a time when each toilet booth TB where a toilet basin 10 is arranged is used with information that identifies each toilet booth TB. The collection information storage unit 122 associates and stores a date and a time when each urinal 20 is used with information that identifies each urinal 20. The collection information storage unit 122 associates and stores a date and a time when each lavatory sink 30 is used with information that identifies each lavatory sink 30. The collection information storage unit 122 associates and stores a date and a time when each toilet space 2 is used with information that identifies each toilet space 2.

For example, the collection information storage unit 122 associates and stores a date and a time when each use item of a toilet is used and a use time period of such use with information that identifies each use item of a toilet. The collection information storage unit 122 associates and stores a date and a time when each toilet basin 10 is used and a use time period of such use with information that identifies each toilet basin 10. The collection information storage unit 122 associates and stores a date and a time when each toilet booth TB where a toilet basin 10 is arranged is used and a use time period of such use with information that identifies each toilet booth TB. The collection information storage unit 122 associates and stores a date and a time when each urinal 20 is used and a use time period of such use with information that identifies each urinal 20. The collection information storage unit 122 associates and stores a date and a time when each lavatory sink 30 is used and a use time period of such use with information that identifies each lavatory sink 30. The collection information storage unit 122 associates and stores a date and a time when each toilet space 2 is used and a use time period of such use with information that identifies each toilet space 2.

Additionally, the above is merely an example, and the collection information storage unit 122 stores a variety of collected information.

By returning to FIG. 4, an explanation will be continued. The control unit 130 is realized by, for example, a CPU (Central Processing Unit), a GPU (Graphics Processing Unit), etc., where a program that is stored inside the analysis device 100 (for example, an abnormality detection program, etc., for a determination process, etc., according to the present disclosure) is executed in a RAM, etc., as a working area. Furthermore, the control unit 130 is a controller (controller) and is realized by, for example, an integrated circuit such as an ASIC (Application Specific Integrated Circuit) and/or a FPGA (Field Programmable Gate Array).

As illustrated in FIG. 4, the control unit 130 has an acquisition unit 131, a calculation unit 132, a determination unit 133, and a transmission unit 134, so as to realize or execute a function and/or an action of information processing as explained below. Additionally, an internal configuration of the control unit 130 is not limited to a configuration as illustrated in FIG. 4 and may be another configuration as long as it is a configuration that executes information processing as described later.

The acquisition unit 131 acquires a variety of information. The acquisition unit 131 acquires a variety of information from the storage unit 120. The acquisition unit 131 receives information from another device. The acquisition unit 131 receives information (detection information, etc.) that is collected by the collection device 50 from the collection device 50. The acquisition unit 131 receives detection information that is detected for a use item of a toilet from the collection device 50. The acquisition unit 131 receives detection information that is detected by a sensor, etc., that correspond(s) to a use item of a toilet from the collection device 50.

The acquisition unit 131 receives detection information that is detected by the detection unit 21 for the toilet space 2 from the collection device 50. The acquisition unit 131 receives detection information that is detected by the detection unit 101 for the toilet basin 10 from the collection device 50. The acquisition unit 131 receives detection information that is detected by the detection unit 101 for the toilet booth TB where the toilet basin 10 is arranged from the collection device 50. The acquisition unit 131 receives detection information that is detected by the detection unit 201 for the urinal 20 from the collection device 50. The acquisition unit 131 receives detection information that is detected by the detection unit 301 for the lavatory sink 30 from the collection device 50.

The acquisition unit 131 acquires information that is used for a process from the storage unit 120. The acquisition unit 131 acquires information that is used for a determination process from the collection information storage unit 122. The acquisition unit 131 acquires information that corresponds to a use item of a toilet that is provided as a determination item from the collection information storage unit 122. The acquisition unit 131 acquires information that is used for calculation of an amount of statistics from the collection information storage unit 122. The acquisition unit 131 acquires information that is used for calculation of a threshold from the collection information storage unit 122.

The acquisition unit 131 acquires information that indicates a tendency of a number of a use(s) per a predetermined time period for one use item that is provided as an item for use that is executed by a user for a toilet. The acquisition unit 131 acquires information that indicates a tendency of a number of a use(s) per a predetermined time period for one use item that is one of a toilet booth, a lavatory sink, a urinal, a toilet basin, and a toilet space. The acquisition unit 131 acquires information that indicates a tendency of a number of a use(s) of one use item for a collection time period before a determination time point that is determined depending on a determination time point for an abnormality.

The acquisition unit 131 acquires information that indicates a tendency of a number of a use(s) of one use item in past. The acquisition unit 131 acquires information that indicates a tendency of a number of a use(s) per a predetermined time period for one use item in past. The acquisition unit 131 acquires information that indicates a tendency of a number of a use(s) per a predetermined time period for another use item other than one use item. The acquisition unit 131 acquires event information that includes a date and a time when a predetermined event occurs. For example, the analysis device 100 is capable of inputting event information from an external interface. The acquisition unit 131 acquires event information that is received by an input unit of the analysis device 100.

The calculation unit 132 executes a calculation process. The calculation unit 132 executes a calculation process by using a variety of information that is stored in the storage unit 120. The calculation unit 132 executes a calculation process by using a variety of information that is acquired from the acquisition unit 131.

The calculation unit 132 calculates a variety of values that are used for a determination process. The calculation unit 132 calculates a threshold that is used for a determination process. The calculation unit 132 calculates an amount of statistics concerning a use item that is provided as a determination item.

The calculation unit 132 calculates an amount of statistics concerning a use item. The calculation unit 132 calculates an amount of statistics of a time period when a use item is used by a user for a predetermined time period or number of times.

The calculation unit 132 executes a calculation process that calculates a number of a use(s). The calculation unit 132 calculates a number of a use(s) of a use item. The calculation unit 132 counts, for one use item, a number of times that such one use item is being used, so as to calculate a number of a use(s) of the one use item. The calculation unit 132 counts a number of times that one use item is being used for today, so as to calculate a number of a use(s) of the one use item for today. The calculation unit 132 counts a number of times that one use item is being used, for each predetermined time period for today, so as to calculate a number of a use(s) per a predetermined time period for the one use item for today. The calculation unit 132 counts a number of times that one use item is being used, on a day before today (in past), so as to calculate a number of a use(s) of the one use item in past.

The determination unit 133 executes a determination process. The determination unit 133 executes a determination process by using a variety of information that is stored in the storage unit 120. The determination unit 133 executes a determination process by using a variety of information that is acquired by the acquisition unit 131. The determination unit 133 executes a determination process by using a variety of values (information) that is/are calculated by the calculation unit 132.

The determination unit 133 executes a determination process by using a threshold that is calculated by the calculation unit 132. The determination unit 133 executes a determination process by using an amount of statistics concerning a use item that is calculated by the calculation unit 132. The determination unit 133 determines whether or not an abnormality concerning one use item occurs, by using an amount of statistics concerning the one use item that is provided as a determination item.

The determination unit 133 determines that an abnormality concerning one use item occurs, in a case where a tendency of a number of a use(s) of one use item is separated from a use tendency of the one use item in past. The determination unit 133 determines that an abnormality concerning one use item occurs, in a case where a tendency of a number of a use(s) of such one use item that is one of a toilet booth, a lavatory sink, a urinal, a toilet basin, and a toilet space is separated from a use tendency of the one use item in past.

The determination unit 133 determines that an abnormality concerning one use item occurs, in a case where a number of a use(s) per a predetermined time period for the one use item falls below a threshold that is based on a number of a use(s) per a time period with a length that corresponds to a predetermined time period for the one use item in past. The determination unit 133 determines that an abnormality concerning one use item does not occur, in a case where a tendency of a number of a use(s) of another use item is separated from a use tendency of the another use item in past and a tendency of a number of a use(s) of the one use item is separated from a use tendency of the one use item in past.

The determination unit 133 determines that an abnormality concerning one use item does not occur, in a case where a determination time point for an abnormality corresponds to a date and a time that are indicated by event information. The determination unit 133 determines whether or not an abnormality concerning one use item occurs, based on a use tendency of the one use item in past except a date and a time that are indicated by event information. The determination unit 133 determines that an abnormality concerning one use item occurs, in a case where a tendency of a number of a use(s) of the one use item is separated from a use tendency of another use item other than the one use item.

The transmission unit 134 transmits information to an external information processing apparatus. The transmission unit 134 transmits information concerning a result of determination that is executed by the determination unit 133 to a manager apparatus that is utilized by a manager that manages the abnormality detection system 1. The transmission unit 134 transmits information concerning a use item of a toilet that is determined to be abnormal, in a case where determination that is executed by the determination unit 133 indicates an abnormality. The transmission unit 134 transmits information that identifies a use item of a toilet that is determined to be abnormal to a manager apparatus, in a case where determination that is executed by the determination unit 133 indicates an abnormality. The transmission unit 134 transmits information that indicates a place where a use item of a toilet that is determined to be abnormal is arranged to a manager apparatus, in a case where determination that is executed by the determination unit 133 indicates an abnormality. Additionally, the transmission unit 134 may transmit information to the collection device 50. For example, the transmission unit 134 transmits information that requests information that is collected by the collection device 50 to the collection device 50.

1-6. Flow of Process

Figure 6:
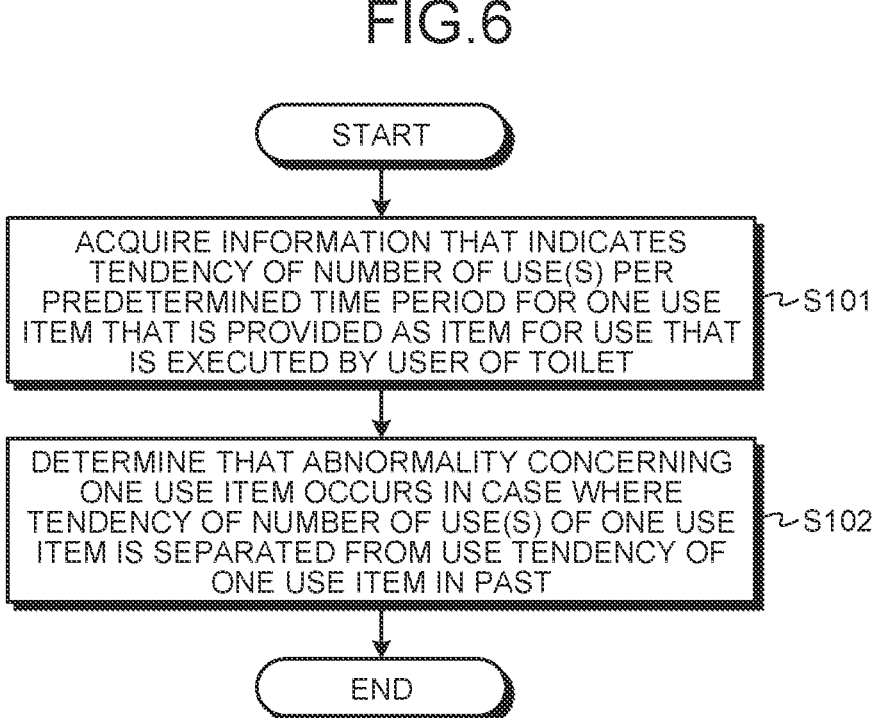
FIG. 6 is a flowchart that illustrates an example of a procedure of a process that is executed by an abnormality detection system.

Hereinafter, a process flow of an abnormality detection process will be explained by using FIG. 6. FIG. 6 is a flowchart that illustrates an example of a procedure of a process that is executed by an abnormality detection system.

An abnormality detection system 1 acquires information that indicates a tendency of a number of a use(s) per a predetermined time period for one use item that is provided as an item for use that is executed by a user of a toilet (step S101). For example, an analysis device 100 of the abnormality detection system 1 acquires information that indicates a number of a use(s) per a predetermined time period for one use item that is one of a toilet booth TB, a lavatory sink 30, a urinal 20, a toilet basin 10, and a toilet space 2.

The abnormality detection system 1 determines that an abnormality concerning one use item occurs, in a case where a tendency of a number of a use(s) of the one use item is separated from a use tendency of the one use item in past (step S102). For example, the analysis device 100 of the abnormality detection system 1 determines that an abnormality concerning one use item occurs, in a case where a number of a use(s) per a predetermined time period for the one use item falls below a threshold that is based on a number of a use(s) per a time period with a length that corresponds to a predetermined time period for the one use item in past.

As described above, a usage state of a use item is not limited to a number of a use(s) per a predetermined time period for a use item and may be any information that indicates a state concerning use of a use item, such as a cumulative use time period per a predetermined time period for a use item. Such a point will be explained by using FIG.

Figure 7:
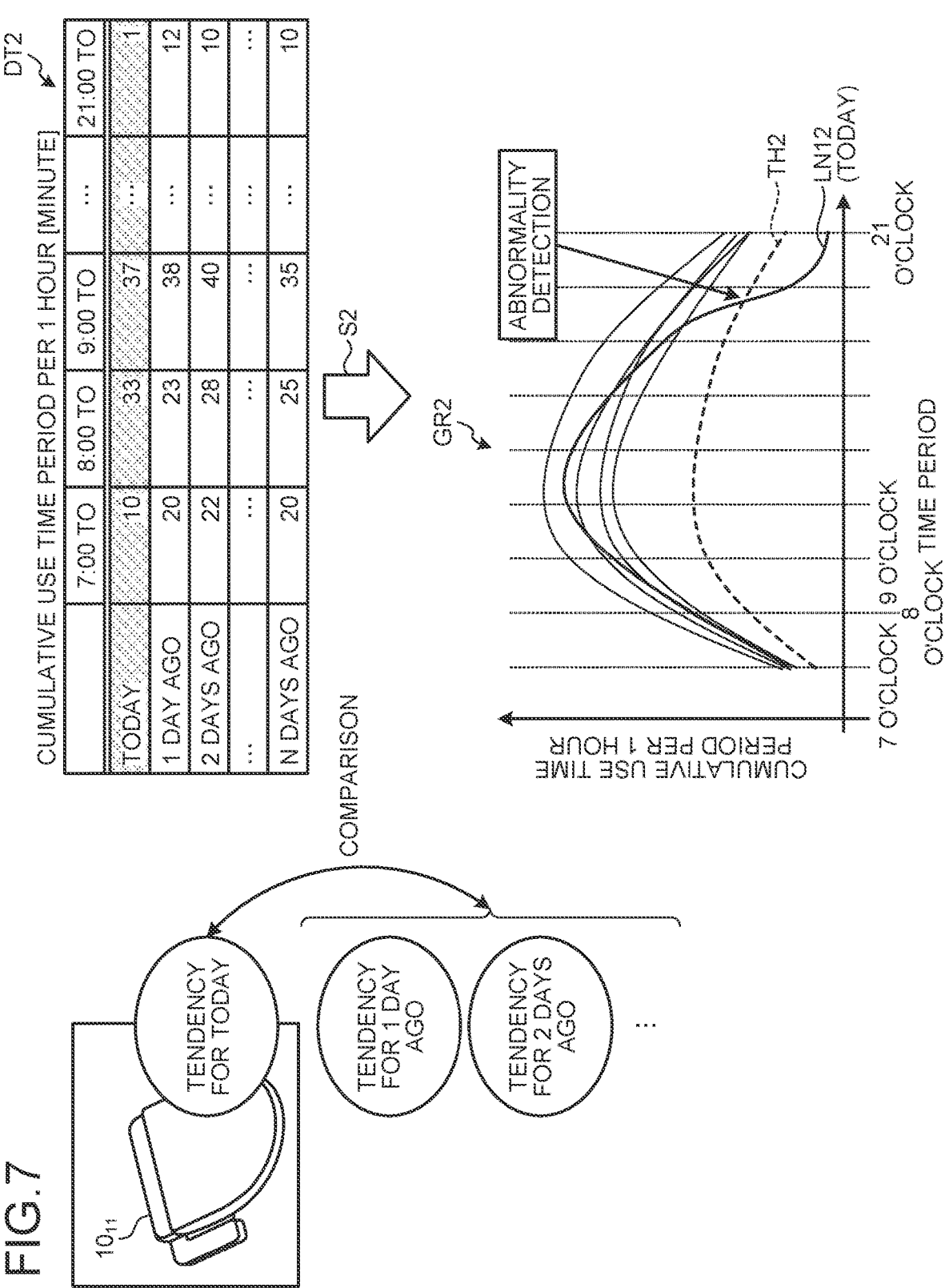
FIG. 7 is a diagram that illustrates an example of an abnormality detection process according to an embodiment.

7. FIG. 7 is a diagram that illustrates an example of an abnormality detection process according to an embodiment. Additionally, an explanation of a point similar to that of FIG. 1 will be omitted appropriately.

The analysis device 100 acquires information that indicates a cumulative use time period for the toilet basin $10_{11}$ that is provided as a detection item. For example, the analysis device 100 acquires information that indicates a time period when such a use item is used, for the toilet basin $10_{11}$. For example, the analysis device 100 acquires information that indicates a time period when such a use item is being used, for the toilet basin $10_{11}$. For example, the analysis device 100 acquires information that indicates a time period when a sensor (a detection unit) that corresponds to such a use item is detecting use of the toilet basin $10_{11}$.

The analysis device 100 sums (accumulates), for one use item, time periods when such one use item is being used, so as to calculate a cumulative use time period for the one use item. The analysis device 100 accumulates (counts) time periods when one use item is being used, on a day (that will also be referred to as "today") that includes a date and a time at a process time point, so as to calculate a cumulative use time period for the one use item for today. The analysis device 100 counts a time period when one use item is being used, for each predetermined time period for today, so as to calculate a cumulative use time period per a predetermined time period for the one use item for today. For example, the analysis device 100 accumulates time periods when one use item is being used, for each hourly time zone within an hour after 7 o'clock (for example, between 7:00 and 8:00), within an hour after 8 o'clock, etc., today, so as to calculate a cumulative use time period per a predetermined time period for the one use item for today.

In FIG. 7, the analysis device 100 accumulates time periods during use of the toilet basin $10_{11}$, for each time zone within an hour after 7 o'clock, within an hour after 8 o'clock, etc., today. Thereby, the analysis device 100 calculates a cumulative use time period per a predetermined time period for today for the toilet basin $10_{11}$.

The analysis device 100 accumulates time periods when one use item is being used, on a day before today (in past), so as to calculate a cumulative use time period for the one use item in past. The analysis device 100 accumulates time periods when one use item is being used, on a previous day (that will also be referred to as "1 day ago") for a day that includes a date and a time at a process time point, so as to calculate a cumulative use time period for the one use item for 1 day ago. The analysis device 100 accumulates time periods when one use item is being used, for each predetermined time period for 1 day ago, so as to calculate a cumulative use time period per a predetermined time period for the one use item for 1 day ago. In FIG. 7, the analysis device 100 accumulates time periods during use of the toilet basin $10_{11}$, for each time zone within an hour after 7 o'clock, within an hour after 8 o'clock, etc., 1 day ago. Thereby, the analysis device 100 calculates a cumulative use time period per a predetermined time period for 1 day ago for the toilet basin $10_{11}$.

The analysis device 100 accumulates time periods when one use item is being used, on a day just before a previous day (that will also be referred to as "2 days ago") for a day that includes a date and a time at a process time point, so as to calculate a cumulative use time period for the one use item for 2 days ago. The analysis device 100 accumulates time periods when one use item is being used, for each predetermined time period for 2 days ago, so as to calculate a cumulative use time period per a predetermined time period for the one use item for 2 days ago. In FIG. 7, the analysis device 100 accumulates time periods during use of the toilet basin $10_{11}$, for each time zone within an hour after 7 o'clock, within an hour after 8 o'clock, etc., 2 days ago. Thereby, the analysis device 100 calculates a cumulative use time period per a predetermined time period for 2 days ago for the toilet basin $10_{11}$.

Similarly, the analysis device 100 accumulates time periods when one use item is being used, for each predetermined time period, on each day in past, such as 3 days ago, 4 days ago, etc., for a day that includes a date and a time at a process time point, so as to calculate a cumulative use time period per a predetermined time period for the one use item on each day in past. Additionally, past may be any time period such as 1 week or 1 month before a process time point. For example, in a case where information of 1 week in past is used, the analysis device 100 accumulates time periods when one use item is being used, for each predetermined time period, on respective days in past that are 1 day ago, 2 days ago, 3 days ago, 4 days ago, 5 days ago, 6 days ago, and 7 days ago for a day that includes a date and a time at a process time point. Thereby, the analysis device 100 calculates a cumulative use time period per a predetermined time period for one use item on respective days in past that are 1 day ago, 2 days ago, 3 days ago, 4 days ago, 5 days ago, 6 days ago, and 7 days ago.

In FIG. 7, the analysis device 100 generates information that indicates a cumulative use time period per 1 hour for each of days of today to N days ago, for the toilet basin $10_{11}$, as illustrated in aggregated data DT2.

The aggregated data DT2 indicates a cumulative use time period per 1 hour for the toilet basin $10_{11}$. For example, the aggregated data DT2 indicate that a cumulative use time period within an hour after 7 o'clock today is 10 minutes, a cumulative use time period within an hour after 8 o'clock today is 33 minutes, and a cumulative use time period within an hour after 9 o'clock today is 37 minutes. Furthermore, the aggregated data DT2 indicate that a cumulative use time period within an hour after 7 o'clock 1 day ago is 20 minutes, a cumulative use time period within an hour after 8 o'clock 1 day ago is 23 minutes, and a cumulative use time period within an hour after 9 o'clock 1 day ago is 38 minutes. Furthermore, the aggregated data DT2 indicate that a cumulative use time period within an hour after 7 o'clock 2 days ago is 22 minutes, a cumulative use time period within an hour after 8 o'clock 2 days ago is 28 minutes, and a cumulative use time period within an hour after 9 o'clock 2 days ago is 40 minutes.

Thus, the analysis device 100 aggregates a cumulative use time period for each time zone on each of a plurality of days for one use item. Thereby, the analysis device 100 is capable of executing determination based on a use tendency of one use item, by using a cumulative use time period per 1 hour for each of a plurality of days, as indicated by a graph GR2 in FIG. 7.

The graph GR2 in FIG. 7 indicates information concerning a cumulative use time period and a threshold on each of today, 1 day ago, 2 days ago, . . . N days ago, for the toilet basin $10_{11}$. A horizontal axis of the graph GR2 indicates a time period and a vertical axis of the graph GR2 indicates a cumulative use time period per 1 hour. It is indicated that a cumulative use time period is increased when moving in a plus (upward) direction of a vertical axis of the graph GR2. Solid lines in the graph GR2 correspond to a plurality of days of today to N days ago, respectively. Additionally, the graph GR2 in FIG. 7 illustrates only solid lines that correspond to some days among respective days of today to N days ago, and a sign of "LN12" is provided to only a solid line that corresponds to today. That is, a line LN12 of the graph GR2 indicates an hourly cumulative use time period for today, among respective days of today to N days ago for the toilet basin $10_{11}$ that is provided as an item.

The analysis device 100 determines whether or not an abnormality for the toilet basin $10_{11}$ occurs, by using a cumulative use time period and a threshold for the toilet basin $10_{11}$ (step S2). In FIG. 7, the analysis device 100 sets a threshold from data of the toilet basin $10_{11}$. For example, the analysis device 100 sets a threshold of abnormality detection from information concerning a cumulative use time period for the toilet basin $10_{11}$. For example, the analysis device 100 calculates a threshold by using a cumulative use time period for the toilet basin $10_{11}$. In FIG. 7, the analysis device 100 calculates an average and a dispersion of a cumulative use time period on each of days of today to N days ago, and calculates a threshold by using a calculated average and dispersion of a cumulative use time period. For example, the analysis device 100 calculates an average and a dispersion of a cumulative use time period on each of days of today to N days ago, for each predetermined time period, and calculates a threshold by using a calculated average and dispersion. For example, the analysis device 100 calculates an average and a dispersion of a cumulative use time period within an hour after 7 o'clock on each of days of today to N days ago, and calculates a threshold within an hour after 7 o'clock, by using a calculated average and dispersion.

A line TH2 that is represented by a dotted line in the graph GR2 in FIG. 7 indicates a threshold for abnormality detection that is a value provided by subtracting a value provided by multiplying a standard deviation (SD: Standard Deviation) by 3 from an average of cumulative use time periods on respective days of today to N days ago. The analysis device 100 calculates a threshold for the toilet basin $10_{11}$ according to a calculation formula of "an average—3SD". Such a threshold is a threshold that is used for determining that an abnormality occurs in a case where a cumulative use time period for a use item falls below a value thereof. Additionally, a threshold as described above is merely an example, and such a threshold may appropriately be set by using a variety of information. For example, information that is used for calculation of a threshold does not have to include information for today. In such a case, the analysis device 100 may calculate an average and a dispersion of cumulative use time periods on respective days of one day ago to N days ago, and calculate a threshold by using a calculated average and dispersion of cumulative use time periods.

The analysis device 100 determines that an abnormality occurs in a use item in a case where a cumulative use time period for such a use item falls below a threshold. In FIG. 7, the analysis device 100 determines that an abnormality occurs in one use item in a case where a cumulative use time period for such one use item falls below a threshold, that is, a case where a cumulative use time period for such one use item is less than such a threshold.

In FIG. 7, a line LN12 that indicates a cumulative use time period for the toilet basin $10_{11}$ for today falls below a line TH2 that indicates a threshold, so that the analysis device 100 determines that an abnormality occurs in the toilet basin $10_{11}$ today. For example, in determination after a line LN12 that indicates a cumulative use time period for the toilet basin $10_{11}$ for today falls below a line TH2 that indicates a threshold, the analysis device 100 determines that an abnormality occurs in the toilet basin $10_{11}$ today. For example, a cumulative use time period within an hour after 19 o'clock today falls below a threshold, so that the analysis device 100 determines that an abnormality occurs in the toilet basin $10_{11}$ before 20 o'clock today.

As described above, the analysis device 100 acquires a cumulative use time period per 1 hour for one use item. Then, the analysis device 100 sets a threshold for abnormality detection from a variation of a cumulative use time period in past (an average—3SD, etc.). The analysis device 100 determines an abnormality occurs in a use item in a case where a cumulative use time period falls below a threshold. Thus, the analysis device 100 compares a cumulative use time period for one use item for a certain time period with a tendency in past, and determines an abnormality in a case where such a tendency is deviated. For example, a PB toilet (a public toilet) indicates a basically similar utilization tendency. Hence, it is possible for the analysis device 100 to detect an abnormality of a use item by comparing it with a tendency in past. For example, even if a cumulative use time period is reduced by nighttime or cleaning, a similar tendency is also indicated in past, so that it is possible for the analysis device 100 to reduce or prevent occurring of erroneous detection of an abnormality, by a process as described above.

According to an aspect of an embodiment, it is possible to determine an abnormality concerning a use item of a toilet appropriately.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An abnormality detection system, comprising:
an acquisition unit that acquires information that indicates a tendency of a usage state of a one use item that is provided as an item for use that is executed by a user of a toilet; and
a determination unit that determines that an abnormality concerning the one use item occurs in a case where a tendency of the usage state of the one use item is separated from a use tendency of the one use item in past, wherein
the acquisition unit acquires information that indicates a tendency of a number of a use(s) per a predetermined time period for the one use item; and
the determination unit
determines that an abnormality concerning the one use item occurs in a case where a tendency of the number of a use(s) of the one use item is separated from a use tendency of the one use item in past, and
determines that an abnormality concerning the one use item occurs in a case where the number of a use(s) per a predetermined time period for the one use item falls below a threshold that is based on a number of a use(s) per a time period with a length that corresponds to the predetermined time period for the one use item in past.

2. The abnormality detection system according to claim 1, wherein
the one use item is one of a toilet booth, a lavatory sink, a urinal, a toilet basin, and a toilet space.

3. The abnormality detection system according to claim 1, wherein:
the acquisition unit acquires information that indicates a tendency of a number of a use(s) per a predetermined time period for another use item other than the one use item; and

US 12,605,019 B2

31 the determination unit determines that an abnormality concerning the one use item does not occur in a case where a tendency of the number of a use(s) of the another use item is separated from a use tendency of the another use item in past and a tendency of the number of a use(s) of the one use item is separated from the use tendency of the one use item in past.

4. The abnormality detection system according to claim 1, wherein:

the acquisition unit acquires event information that includes a date and a time when a predetermined event occurs; and the determination unit determines that the abnormality concerning the one use item does not occur in a case where a determination time point for the abnormality corresponds to a date and a time that are indicated by the event information.

5. The abnormality detection system according to claim 4, wherein:

the determination unit determines whether or not an abnormality concerning the one use item occurs, based on the use tendency of the one use item in past except a date and a time that are indicated by the event information.

6. An abnormality detection system comprising:

an acquisition unit that acquires information that indicates a tendency of a usage state of a one use item that is provided as an item for use that is executed by a user of a toilet; and a determination unit that determines that an abnormality concerning the one use item occurs in a case where a tendency of the usage state of the one use item is separated from a use tendency of the one use item in past, wherein the acquisition unit acquires information that indicates a tendency of a cumulative use time period per a predetermined time period for the one use item, the determination unit determines that an abnormality concerning the one use item occurs in a case where a tendency of the cumulative use time period for the one use item is separated from the use tendency of the one use item in past, and the determination unit determines that an abnormality concerning the one use item occurs in a case where the cumulative use time period per a predetermined time period for the one use item falls below a threshold that is based on a cumulative use time period per a time period with a length that corresponds to the predetermined time period for the one use item in past.

7. The abnormality detection system according to claim 6, wherein the one use item is one of a toilet booth, a lavatory sink, a urinal, a toilet basin, and a toilet space.

8. The abnormality detection system according to claim 6, wherein:

the acquisition unit acquires information that indicates a tendency of a cumulative use time period per a predetermined time period for another use item other than the one use item; and the determination unit determines that an abnormality concerning the one use item does not occur in a case where a tendency of the cumulative use time period for the another use item is separated from a use tendency of the another use item in past and a tendency of the cumulative use time period for the one use item is separated from the use tendency of the one use item in past.

9. The abnormality detection system according to claim 6 wherein:

the acquisition unit acquires event information that includes a date and a time when a predetermined event occurs; and the determination unit determines that the abnormality concerning the one use item does not occur in a case where a determination time point for the abnormality corresponds to a date and a time that are indicated by the event information.

10. The abnormality detection system according to claim 9, wherein:

the determination unit determines whether or not an abnormality concerning the one use item occurs, based on the use tendency of the one use item in past except a date and a time that are indicated by the event information.

* * * * *